United States Patent
Horiuchi et al.

(10) Patent No.: US 12,374,764 B2
(45) Date of Patent: Jul. 29, 2025

(54) SECONDARY BATTERY

(71) Applicant: MURATA MANUFACTURING CO., LTD., Kyoto (JP)

(72) Inventors: Hiroshi Horiuchi, Kyoto (JP); Masayuki Ihara, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 532 days.

(21) Appl. No.: 17/973,778

(22) Filed: Oct. 26, 2022

(65) Prior Publication Data

US 2023/0059279 A1    Feb. 23, 2023

Related U.S. Application Data

(63) Continuation of application No. PCT/JP2021/014726, filed on Apr. 7, 2021.

(30) Foreign Application Priority Data

Apr. 30, 2020    (JP) ................. 2020-080779

(51) Int. Cl.
*H01M 50/547*    (2021.01)
*H01M 10/0525*    (2010.01)
(Continued)

(52) U.S. Cl.
CPC ..... *H01M 50/547* (2021.01); *H01M 10/0525* (2013.01); *H01M 10/0587* (2013.01);
(Continued)

(58) Field of Classification Search
CPC ............ H01M 50/547; H01M 50/105; H01M 50/528; H01M 50/14; H01M 10/0525; H01M 10/0587
See application file for complete search history.

(56) References Cited

U.S. PATENT DOCUMENTS

2004/0045597 A1    3/2004   Kimijima et al.
2011/0244318 A1    10/2011  Cho et al.
(Continued)

FOREIGN PATENT DOCUMENTS

JP    2003151512 A    5/2003
JP    2006278245 A    10/2006
(Continued)

OTHER PUBLICATIONS

Machine Translation of JP 2016/170966 (cited on IDS) (Year: 2016).*
International Search Report of corresponding PCT application PCT/JP2021/014726, dated Jun. 29, 2021.
Japanese Office Action issued Apr. 11, 2023 in corresponding Japanese Application No. 2022-517587.

*Primary Examiner* — Eugenia Wang
(74) *Attorney, Agent, or Firm* — K&L Gates LLP

(57) ABSTRACT

A secondary battery includes an outer package member, a battery device, a positive electrode terminal, a negative electrode terminal, and a fixing member. The outer package member has flexibility. The battery device has an elongated shape, and is contained inside the outer package member. The battery device includes a positive electrode and a negative electrode. The positive electrode terminal is coupled to the positive electrode, and is led out to an outside of the outer package member. The negative electrode terminal is coupled to the negative electrode, and is led out to the outside of the outer package member. The fixing member is disposed between the outer package member and the battery device, and is adhered to each of the outer package member and the battery device. The positive electrode and the negative electrode are opposed to each other and are wound in a first direction.

8 Claims, 10 Drawing Sheets

(51) Int. Cl.
*H01M 10/0587* (2010.01)
*H01M 50/105* (2021.01)
*H01M 50/14* (2021.01)
*H01M 50/528* (2021.01)

(52) U.S. Cl.
CPC ....... *H01M 50/105* (2021.01); *H01M 50/528* (2021.01); *H01M 50/14* (2021.01)

(56) References Cited

U.S. PATENT DOCUMENTS

| | | |
|---|---|---|
| 2013/0309533 A1 | 11/2013 | Nakamura |
| 2015/0010797 A1 | 1/2015 | Kim |
| 2015/0171383 A1 | 6/2015 | Ahn et al. |

FOREIGN PATENT DOCUMENTS

| | | |
|---|---|---|
| JP | 2007242519 A | 9/2007 |
| JP | 2008171583 A | 7/2008 |
| JP | 2011222469 A | 11/2011 |
| JP | 2015015236 A | 1/2015 |
| JP | 2015118921 A | 6/2015 |
| JP | 2016-170966 | 9/2016 |
| JP | 2016170966 A | 9/2016 |
| JP | 6052574 B2 | 12/2016 |
| JP | 2019-207750 | 12/2019 |

\* cited by examiner

SECONDARY BATTERY

CROSS REFERENCE TO RELATED APPLICATIONS

The present application is a continuation of PCT patent application no. PCT/JP2021/014726, filed on Apr. 7, 2021, which claims priority to Japanese patent application no. JP2020-080779, filed on Apr. 30, 2020, the entire contents of which are being incorporated herein by reference.

BACKGROUND

The present technology relates to a secondary battery.

Various kinds of electronic equipment, including mobile phones, have been widely used. Such widespread use has promoted development of a secondary battery as a power source that is smaller in size and lighter in weight and allows for a higher energy density. The secondary battery includes a positive electrode, a negative electrode, and an electrolytic solution. A configuration of the secondary battery has been considered in various ways.

Specifically, in order to prevent sealing failure in a battery case, an insulating member is interposed between the battery case and a housed body such as a power generation element, and the insulating member is fixed to the housed body. In order to prevent cut off of an electrode plate core, a rolling stop tape is stuck to a curvature part (an R part) of a flat spiral electrode group. In order to prevent an electrode assembly from becoming displaced (fluctuated) due to influences of vibration, a raised portion is provided inside a case, and the electrode assembly is fixed using the raised portion. In order to prevent an electrode assembly from moving within a case, a jelly roll tape including an adhesive tape such as an oriented polystyrene film is attached to the electrode assembly.

SUMMARY

The present application relates to a secondary battery.

Consideration has been given in various ways to improve various characteristics of a secondary battery; however, the secondary battery still remains insufficient in terms of energy density, physical durability, and safety. Accordingly, there is still room for improvement in terms thereof.

The present technology has been made in view of such an issue and relates to providing a secondary battery that is able to achieve superior physical durability and superior safety while securing energy density according to an embodiment.

A secondary battery according to an embodiment of the present technology includes an outer package member, a battery device, a positive electrode terminal, a negative electrode terminal, and a fixing member. The outer package member has flexibility. The battery device has an elongated shape, and is contained inside the outer package member. The battery device includes a positive electrode and a negative electrode. The positive electrode terminal is coupled to the positive electrode, and is led out to an outside of the outer package member. The negative electrode terminal is coupled to the negative electrode, and is led out to the outside of the outer package member. The fixing member is disposed between the outer package member and the battery device, and is adhered to each of the outer package member and the battery device. The positive electrode and the negative electrode are opposed to each other and are wound in a first direction. The positive electrode terminal and the negative electrode terminal are separated from each other and each extend in a second direction intersecting the first direction. Where the battery device is divided into a first region on an outer side relative to the positive electrode terminal, a second region on an outer side relative to the negative electrode terminal, and a third region between the positive electrode terminal and the negative electrode terminal, the fixing member is not disposed in the third region and is disposed in each of the first region and the second region. A proportion of a dimension of the fixing member in the second direction to a dimension of the battery device in the second direction is greater than or equal to 50% and less than or equal to 100%. The positive electrode includes a positive electrode current collector having a surface on an outer side of winding and a surface on an inner side of the winding, and a positive electrode active material layer provided on each of the surface on the outer side of the winding and the surface on the inner side of the winding; the positive electrode and the negative electrode are wound in such a manner that the positive electrode is disposed in an outermost wind; and, in the positive electrode of the outermost wind, the positive electrode active material layer is not provided on the surface on the outer side of the winding, and the surface on the outer side of the winding is exposed, whereas the positive electrode active material layer is provided on the surface on the inner side of the winding. Alternatively, the negative electrode includes a negative electrode current collector having a surface on the outer side of the winding and a surface on the inner side of the winding, and a negative electrode active material layer provided on each of the surface on the outer side of the winding and the surface on the inner side of the winding; the positive electrode and the negative electrode are wound in such a manner that the negative electrode is disposed in the outermost wind; and, in the negative electrode of the outermost wind, the negative electrode active material layer is not provided on the surface on the outer side of the winding, and the surface on the outer side of the winding is exposed, whereas the negative electrode active material layer is provided on the surface on the inner side of the winding.

According to the secondary battery of an embodiment of the present technology, the battery device having the elongated shape is contained inside the outer package member having flexibility, and the fixing member is disposed between the outer package member and the battery device. The fixing member is not disposed in the third region and is disposed in each of the first region and the second region. The fixing member is thus adhered to each of the outer package member and the battery device. The proportion of the dimension of the fixing member to the dimension of the battery device is greater than or equal to 50% and less than or equal to 100%. The positive electrode and the negative electrode are wound in such a manner that the positive electrode is disposed in the outermost wind; and, in the positive electrode of the outermost wind, the positive electrode active material layer is not provided on the surface on the outer side of the winding, whereas the positive electrode active material layer is provided on the surface on the inner side of the winding. Alternatively, the positive electrode and the negative electrode are wound in such a manner that the negative electrode is disposed in the outermost wind; and, in the negative electrode of the outermost wind, the negative electrode active material layer is not provided on the surface on the outer side of the winding, whereas the negative electrode active material layer is provided on the surface on the inner side of the winding. Accordingly, it is possible to achieve superior physical durability and superior safety while securing energy density.

Note that effects of the present technology are not necessarily limited to those described herein and may include any of a series of suitable effects in relation to the present technology.

DETAILED DESCRIPTION

One or more embodiments of the present technology are described below in further detail including with reference to the drawings.

A description is given first of a secondary battery according to an embodiment of the present technology.

The secondary battery to be described here is a secondary battery that obtains a battery capacity using insertion and extraction of an electrode reactant, and includes a positive electrode, a negative electrode, and an electrolytic solution which is a liquid electrolyte. In the secondary battery, to prevent precipitation of the electrode reactant on a surface of the negative electrode during charging, a charge capacity of the negative electrode is greater than a discharge capacity of the positive electrode. In other words, an electrochemical capacity per unit area of the negative electrode is set to be greater than an electrochemical capacity per unit area of the positive electrode.

Although not particularly limited in kind, the electrode reactant is specifically a light metal such as an alkali metal or an alkaline earth metal. Examples of the alkali metal include lithium, sodium, and potassium. Examples of the alkaline earth metal include beryllium, magnesium, and calcium.

Examples are given below of a case where the electrode reactant is lithium. A secondary battery that obtains a battery capacity using insertion and extraction of lithium is a so-called lithium-ion secondary battery. In the lithium-ion secondary battery, lithium is inserted and extracted in an ionic state.

Figure 1:
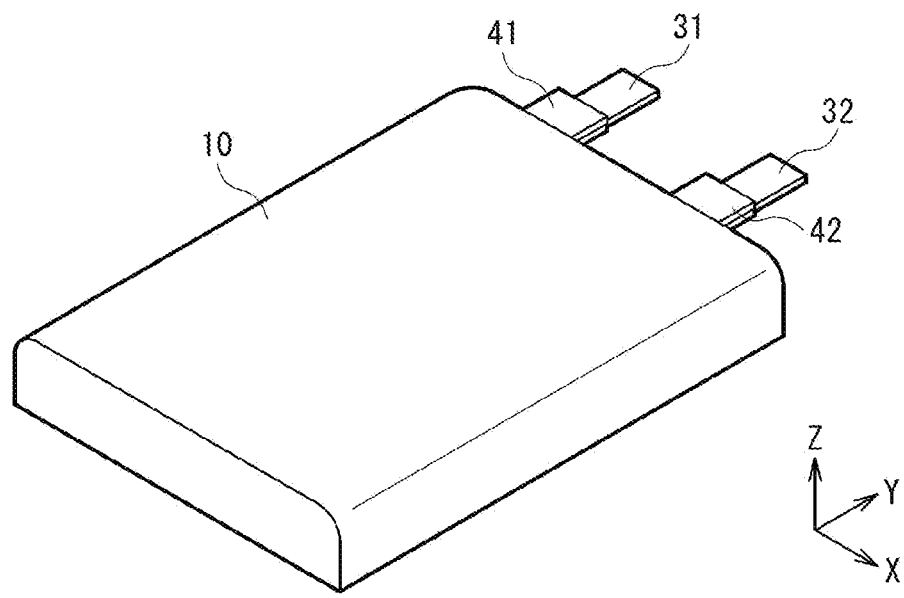
FIG. 1 is a perspective view of a configuration of a secondary battery according to an embodiment of the present technology.
Figure 2:
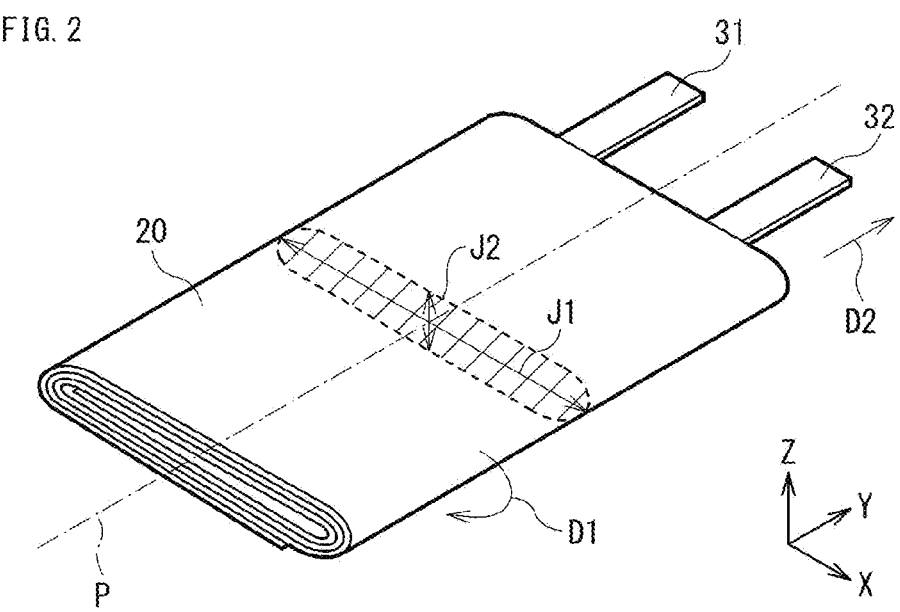
FIG. 2 is a perspective view of a configuration of a battery device.
Figure 3:
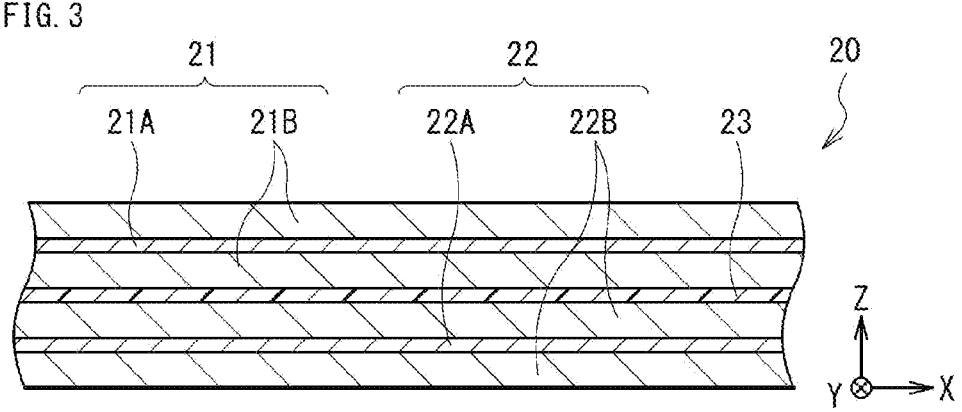
FIG. 3 is an enlarged sectional view of a portion of the configuration of the battery device illustrated in FIG. 2.
Figure 4:
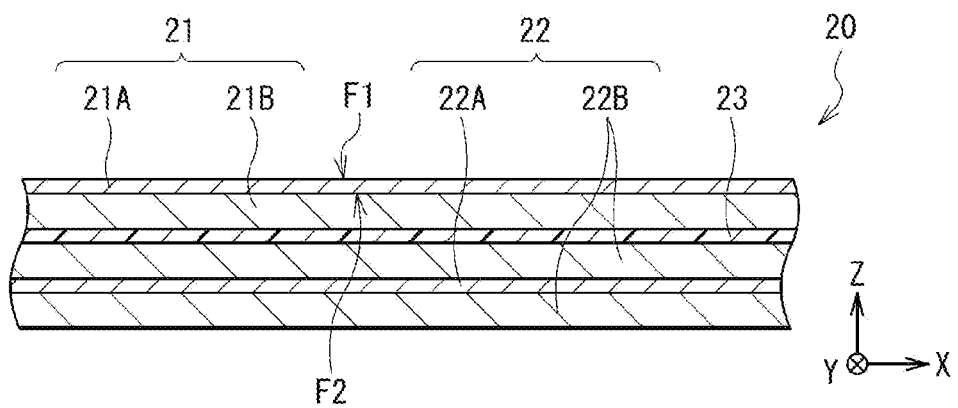
FIG. 4 is an enlarged sectional view of another portion of the configuration of the battery device illustrated in FIG. 2.

FIG. 1 illustrates a perspective configuration of a secondary battery. FIG. 2 illustrates a perspective configuration of a battery device 20. FIGS. 3 and 4 each illustrate an enlarged view of a portion of a sectional configuration of the battery device 20 illustrated in FIG. 2.

Figure 5:
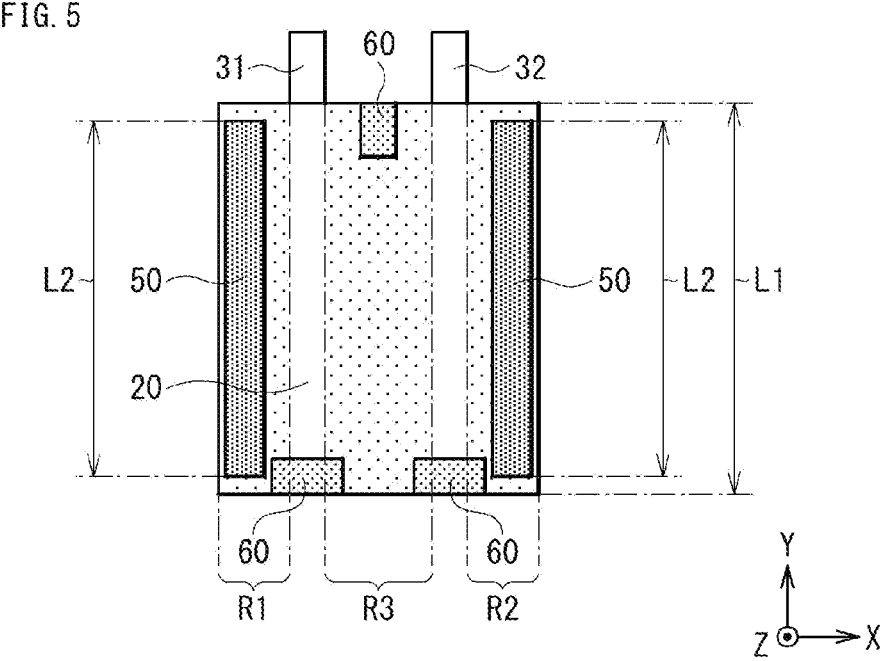
FIG. 5 is a plan view of the configuration (a proportion=90%) of the battery device illustrated in FIG. 2.
Figure 6:
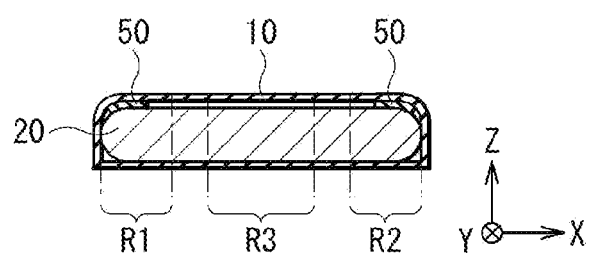
FIG. 6 is a sectional view of the configuration of the secondary battery illustrated in FIG. 1.
Figure 7:
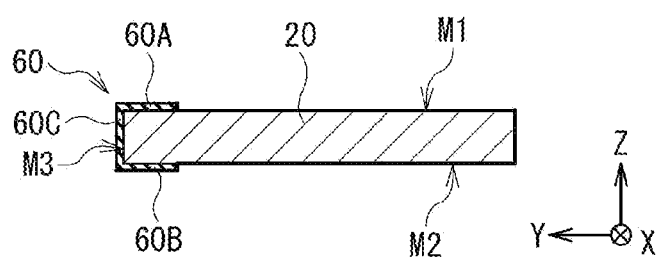
FIG. 7 is a sectional view of a configuration of the battery device illustrated in FIG. 5.

FIG. 5 illustrates a planar configuration of the battery device 20 illustrated in FIG. 2. FIG. 6 illustrates a sectional configuration of the secondary battery illustrated in FIG. 1. FIG. 7 illustrates a sectional configuration of the battery device 20 illustrated in FIG. 5.

Note that FIG. 2 illustrates a positive electrode lead 31 and a negative electrode lead 32 together with the battery device 20, and also illustrates a section of the battery device 20 along an XZ plane with a dashed line.

FIG. 3 illustrates a section of a portion in the middle of winding of the battery device 20, and FIG. 4 illustrates a section of a portion near an outermost wind of the battery device 20. Note that, in each of FIGS. 3 and 4, an upper side is an outer side of the winding (a side farther from a winding axis P to be described later), and a lower side is an inner side of the winding (a side closer to the winding axis P).

FIG. 5 also illustrates the positive electrode lead 31, the negative electrode lead 32, a fixing tape 50, and a correcting tape 60, together with the battery device 20. FIG. 6 illustrates a section of the secondary battery along the XZ plane, and FIG. 7 illustrates a section of the battery device 20 along the YZ plane. Note that FIG. 7 also illustrates the correcting tape 60 together with the battery device 20.

As illustrated in FIGS. 1 to 7, the secondary battery includes an outer package film 10, the battery device 20, the positive electrode lead 31, the negative electrode lead 32, sealing films 41 and 42, the fixing tape 50, and the correcting tape 60. The secondary battery described here is a secondary battery of a laminated-film type. The secondary battery of the laminated-film type includes the outer package film 10 having flexibility or softness to contain the battery device 20.

As illustrated in FIGS. 1 and 2, the outer package film 10 is an outer package member having flexibility that contains the battery device 20, and has a pouch-shaped structure. The outer package film 10 thus contains a positive electrode 21, a negative electrode 22, and an electrolytic solution which are to be described later.

A three-dimensional shape of the outer package film 10 is not particularly limited, and corresponds to a three-dimensional shape of the battery device 20. Here, the three-dimensional shape of the outer package film 10 is an elongated, substantially rectangular parallelepiped which corresponds to the three-dimensional shape of the battery device 20 having an elongated shape to be described later.

The outer package film 10 is not particularly limited in configuration (materials, the number of layers, etc.), and may be single-layered or multi-layered. Here, the outer package film 10 is a three-layer laminated film including a fusion-bonding layer, a metal layer, and a surface protective layer that are stacked in this order from an inner side. The fusion-bonding layer includes a polymer compound such as polypropylene. The metal layer includes a metal material such as aluminum. The surface protective layer includes a polymer compound such as nylon.

The sealing film 41 is interposed between the outer package film 10 and the positive electrode lead 31. The sealing film 42 is interposed between the outer package film 10 and the negative electrode lead 32.

The sealing film 41 is a sealing member that prevents entry of outside air into the outer package film 10, and includes one or more of polymer compounds, including polyolefin, that have adherence to the positive electrode lead 31. Examples of the polyolefin include polyethylene, polypropylene, modified polyethylene, and modified polypropylene. A configuration of the sealing film 42 is similar to that of the sealing film 41 except that the sealing film 42 is a sealing member that has adherence to the negative electrode lead 32. In other words, the sealing film 42 includes one or more of polymer compounds, including polyolefin, that have adherence to the negative electrode lead 32. Note that the sealing films 41 and 42 may each be omitted.

As illustrated in FIGS. 1 to 5, the battery device 20 is an electric power generating device having an elongated shape, and includes the positive electrode 21, the negative electrode 22, a separator 23, and the electrolytic solution (not illustrated). The battery device 20 is contained inside the outer package film 10.

Here, the battery device 20 is a so-called wound electrode body. That is, in the battery device 20, the positive electrode 21 and the negative electrode 22 are stacked on each other with the separator 23 interposed therebetween, and the stack of the positive electrode 21, the negative electrode 22, and the separator 23 is wound about the winding axis P in a winding direction D1 (a first direction). Accordingly, the positive electrode 21 and the negative electrode 22 are opposed to each other with the separator 23 interposed therebetween. The winding axis P is a virtual axis extending in a Y-axis direction.

The battery device 20 has an elongated three-dimensional shape. Thus, as illustrated in FIG. 2, a section of the battery device 20 intersecting the winding axis P, that is, the section of the battery device 20 along the XZ plane, has an elongated shape defined by a major axis J1 and a minor axis J2. The major axis J1 is a virtual axis extending in an X-axis direction and is larger in length than the minor axis J2. The minor axis J2 is a virtual axis extending in a Z-axis direction intersecting the X-axis direction and is smaller in length than the major axis J1. Here, the section of the battery device 20 has an elongated, substantially elliptical shape.

As illustrated in FIGS. 3 and 4, the positive electrode 21 includes a positive electrode current collector 21A and a positive electrode active material layer 21B.

The positive electrode current collector 21A has two opposed surfaces (a surface F1 on the outer side of the winding and a surface F2 on the inner side of the winding) on each of which the positive electrode active material layer 21B is to be disposed. The positive electrode current collector 21A includes one or more of electrically conductive materials including, without limitation, a metal material. Examples of the metal material include aluminum, nickel, and stainless steel.

The positive electrode active material layer 21B is provided on each of the surface F1 on the outer side of the winding and the surface F2 on the inner side of the winding. The positive electrode active material layer 21B includes a positive electrode active material into which lithium is insertable and from which lithium is extractable. Note that the positive electrode active material layer 21B may further include, for example, a positive electrode binder and a positive electrode conductor. A method of forming the positive electrode active material layer 21B is not particularly limited, and specifically includes one or more of methods including, without limitation, a coating method.

The positive electrode active material is a lithium-containing compound, and more specifically, a transition metal compound such as a lithium-transition-metal compound. A reason for this is that a high a high energy density is obtainable. The lithium-transition-metal compound is a compound including lithium and one or more transition metal elements as constituent elements. The lithium-transition-metal compound is not particularly limited in kind, and is specifically, for example, an oxide, a phosphoric acid compound, a silicic acid compound, or a boric acid compound. Specific examples of the oxide include $LiNiO_2$, $LiCoO_2$, and $LiMn_2O_4$. Specific examples of the phosphoric acid compound include $LiFePO_4$ and $LiMnPO_4$.

The positive electrode binder includes one or more of materials including, without limitation, a synthetic rubber and a polymer compound. Examples of the synthetic rubber include a styrene-butadiene-based rubber. Examples of the polymer compound include a polyvinylidene difluoride. The positive electrode conductor includes one or more of electrically conductive materials including, without limitation, a carbon material. Examples of the carbon material include graphite, carbon black, acetylene black, and Ketjen black. The electrically conductive material may be a metal material or a polymer compound, for example.

Here, the positive electrode 21 and the negative electrode 22 are wound in such a manner that the positive electrode 21 is disposed on the outer side of the winding relative to the negative electrode 22. The positive electrode 21 is thus disposed in the outermost wind, as illustrated in FIG. 4.

In this case, in the positive electrode 21 of the outermost wind, the positive electrode active material layer 21B is provided only on the surface F2 on the inner side of the winding, out of the two opposed surfaces (the surface F1 on the outer side of the winding and the surface F2 on the inner side of the winding) of the positive electrode current collector 21A. In other words, as illustrated in FIG. 4, in the positive electrode 21 of the outermost wind, the positive electrode active material layer 21B is provided on the surface F2 on the inner side of the winding, whereas no positive electrode active material layer 21B is provided on the surface F1 on the outer side of the winding. The surface F1 on the outer side of the winding (the positive electrode current collector 21A) is thus exposed.

A reason why the positive electrode active material layer 21B is provided on the surface F2 on the inner side of the winding and no positive electrode active material layer 21B is provided on the surface F1 on the outer side of the winding is that winding displacement of the positive electrode 21 of the outermost wind is prevented from occurring easily when the secondary battery undergoes a shock upon being dropped, for example, which helps to prevent the secondary battery from moving easily inside the outer package film 10, as compared with a case where the positive electrode active material layer 21B is provided neither on the surface F1 on the outer side of the winding nor on the surface F2 on the inner side of the winding. Another reason why the positive electrode active material layer 21B is provided on the surface F2 on the inner side of the winding and no positive electrode active material layer 21B is provided on the surface F1 on the outer side of the winding is that a thickness (a maximum dimension in the Z-axis direction) of the battery device 20 decreases as compared with a case where the positive electrode active material layer 21B is provided on each of the surface F1 on the outer side of the winding and the surface F2 on the inner side of the winding.

It is sufficient that a range over which no positive electrode active material layer 21B is provided on the surface F1 on the outer side of the winding is greater than or equal to a range of one wind from an outermost winding end of the positive electrode 21. Thus, the range in which no positive electrode active material layer 21B is provided may be limited to the range of one wind from the outermost winding end of the positive electrode 21, or may be larger than the range of one wind from the outermost end of the positive electrode 21. Examples of the "range larger than the range of one wind from the outermost end" include, without limitation, a range of 1.5 winds and a range of 2 winds.

As illustrated in FIGS. 3 and 4, the negative electrode 22 includes a negative electrode current collector 22A and a negative electrode active material layer 22B.

The negative electrode current collector 22A has two opposed surfaces (a surface on the outer side of the winding and a surface on the inner side of the winding) on each of which the negative electrode active material layer 22B is to be disposed. The negative electrode current collector 22A includes one or more of electrically conductive materials including, without limitation, a metal material. Examples of the metal material include copper, aluminum, nickel, and stainless steel.

The negative electrode active material layer 22B is provided on each of the surface on the outer side of the winding of the negative electrode current collector 22A and the surface on the inner side of the winding of the negative electrode current collector 22A. The negative electrode active material layer 22B includes a negative electrode active material into which lithium is insertable and from which lithium is extractable. Note that the negative electrode active material layer 22B may further include, for example, a negative electrode binder and a negative electrode conductor. Details of the negative electrode binder are similar to those of the positive electrode binder. Details of the negative electrode conductor are similar to those of the positive electrode conductor. A method of forming the negative electrode active material layer 22B is not particularly limited, and specifically includes one or more of methods including, without limitation, a coating method, a vapor-phase method, a liquid-phase method, a thermal spraying method, and a firing (sintering) method.

The negative electrode active material includes one or more of materials including, without limitation, a carbon material and a metal-based material. A reason for this is that a high energy density is obtainable. Examples of the carbon material include graphitizable carbon, non-graphitizable carbon, and graphite (natural graphite and artificial graphite). The metal-based material is a material that includes, as a constituent element or constituent elements, one or more elements among metal elements and metalloid elements that are each able to form an alloy with lithium. Examples of such metal elements and metalloid elements include silicon and tin. The metal-based material may be a simple substance, an alloy, a compound, a mixture of two or more thereof, or a material including two or more phases thereof. Specific examples of the metal-based material include $TiSi_2$ and $SiO_x$ ($0<x\leq2$ or $0.2<x<1.4$).

Here, as described above, the positive electrode 21 and the negative electrode 22 are wound in such a manner that the positive electrode 21 is disposed on the outer side of the winding relative to the negative electrode 22. The positive electrode 21 is thus disposed in the outermost wind. Accordingly, in the negative electrode 22 that is opposed to the positive electrode 21 of the outermost wind with the separator 23 interposed therebetween, the negative electrode active material layer 22B is provided on each of the surface on the outer side of the winding of the negative electrode current collector 22A and the surface on the inner side of the winding of the negative electrode current collector 22A, as illustrated in FIG. 4.

The separator 23 is an insulating porous film interposed between the positive electrode 21 and the negative electrode 22 as illustrated in FIGS. 3 and 4, and allows lithium ions to pass therethrough while preventing contact between the positive electrode 21 and the negative electrode 22. The separator 23 includes one or more of polymer compounds including, without limitation, polytetrafluoroethylene, polypropylene, and polyethylene.

The electrolytic solution includes a solvent and an electrolyte salt. The positive electrode 21, the negative electrode 22, and the separator 23 are each impregnated with the electrolytic solution.

The solvent includes one or more of non-aqueous solvents (organic solvents) including, without limitation, a carbonic-acid-ester-based compound, a carboxylic-acid-ester-based compound, and a lactone-based compound. An electrolytic solution including a non-aqueous solvent is a so-called non-aqueous electrolytic solution. The electrolyte salt includes one or more of light metal salts including, without limitation, a lithium salt.

As illustrated in FIGS. 1, 2, and 5, the positive electrode lead 31 is a positive electrode terminal coupled to the battery device 20. More specifically, the positive electrode lead 31 is coupled to the positive electrode 21 (the positive electrode current collector 21A). The positive electrode lead 31 is led out from an inside to an outside of the outer package film 10, and extends in a leading-out direction D2 (a second direction) intersecting the winding direction D1. Here, the leading-out direction D2 corresponds to the Y-axis direction.

The positive electrode lead 31 includes one or more of electrically conductive materials including, without limitation, aluminum. A shape of the positive electrode lead 31 is not particularly limited. Specifically, the positive electrode lead 31 has a shape such as a thin plate shape or a meshed shape.

As illustrated in FIGS. 1, 2, and 5, the negative electrode lead 32 is a negative electrode terminal coupled to the battery device 20. More specifically, the negative electrode lead 32 is coupled to the negative electrode 22 (the negative electrode current collector 22A). In a similar manner to the positive electrode lead 31 described above, the negative electrode lead 32 is led out from the inside to the outside of the outer package film 10, and extends in the leading-out direction D2.

Note that the negative electrode lead 32 is separated from the positive electrode lead 31 in order to prevent a short circuit. In other words, the positive electrode lead 31 and the negative electrode lead 32 each extend in the leading-out direction D2 while being separated from each other, and are thus led out to the outside of the outer package film 10.

The negative electrode lead 32 includes one or more of electrically conductive materials including, without limitation, copper, nickel, and stainless steel. Note that details of a shape of the negative electrode lead 32 is similar to those of the shape of the positive electrode lead 31.

As illustrated in FIGS. 5 and 6, the fixing tape 50 is a tape-shaped fixing member that fixes the battery device 20 to the outer package film 10. The fixing tape 50 is disposed between the outer package film 10 and the battery device 20, and is adhered to each of the outer package film 10 and the battery device 20. A surface of the battery device 20 is thus fixed to an inner surface of the outer package film 10 via the fixing tape 50.

As described above, the battery device 20 is contained inside the outer package film 10 having flexibility, and is a wound electrode body in which the positive electrode 21 and the negative electrode 22 are wound. In the battery device 20, the positive electrode lead 31 is coupled to the positive electrode 21 and the negative electrode lead 32 is coupled to the negative electrode 22. In this case, a position of the fixing tape 50, that is, a position at which the battery device 20 is fixed to the outer package film 10 via the fixing tape 50, is made appropriate in such a manner as to be a predetermined position.

Specifically, as illustrated in FIG. 5, in a planar configuration of the battery device 20 to which the positive electrode lead 31 and the negative electrode lead 32 are each coupled, the battery device 20 is divided into three regions (regions R1, R2, and R3) on the basis of respective positions of the positive electrode lead 31 and the negative electrode lead 32. The region R1 is a region on an outer side relative to the positive electrode lead 31 (on a left side relative to the positive electrode lead 31 in FIG. 5). The region R2 is a region on an outer side relative to the negative electrode lead 32 (on a right side relative to the negative electrode lead 32 in FIG. 5). The region R3 is a region between the positive electrode lead 31 and the negative electrode lead 32. In FIG. 5, each of the regions R1 to R3 is shaded lightly.

In this case, the fixing tape 50 is not disposed in the region R3 but is disposed in each of the regions R1 and R2. The secondary battery thus includes two fixing tapes 50. In other words, the secondary battery includes the fixing tape 50 disposed within a range of the region R1 and the fixing tape 50 disposed within a range of the region R2. In FIG. 5, the fixing tape 50 is shaded darker than the regions R1 to R3.

A reason why the fixing tape 50 is not disposed in the region R3 but disposed in each of the regions R1 and R2 is that, in a case where the positive electrode lead 31 and the negative electrode lead 32 are each coupled to the battery device 20 (the wound electrode body) and where the battery device 20 is contained inside the outer package film 10 having flexibility, the position of the battery device 20 fixed to the outer package film 10 is made appropriate via the fixing tape 50. This prevents the battery device 20 from moving easily inside the outer package film 10 when the secondary battery undergoes a shock and also prevents temperature of the secondary battery from increasing easily upon heat generation, while thinness of the secondary battery is secured. Details of the reason described here will be described later.

Here, as described above, the positive electrode 21 is disposed in the outermost wind of the battery device 20, and, in such a positive electrode 21 of the outermost wind, the surface F1 on the outer side of the winding of the positive electrode current collector 21A is exposed. The fixing tape 50 is thus adhered to the surface F1 on the outer side of the winding of the positive electrode current collector 21A.

It should be noted that a component of the secondary battery that is not disposed in the region R3 and is disposed in each of the regions R1 and R2 is not the correcting tape 60 but is the fixing tape 50. The fixing tape 50 is adhered to each of the outer package film 10 and the battery device 20 as described above. It is thus necessary that a location where the fixing tape 50 is disposed be controlled to be each of the regions R1 and R2 but not the region R3. In contrast, the correcting tape 60 is not attached to the outer package film 10 but is attached only to the battery device 20. It is thus unnecessary that a location where the correcting tape 60 is provided be controlled to be each of the regions R1 and R2 but not the region R3, unlike the location where the fixing tape 50 is disposed.

The fixing tape 50 is not particularly limited in kind as long as the fixing tape 50 is able to adhere the outer package film 10 and the battery device 20 to each other. In particular, the fixing tape 50 preferably includes one or more of heat adhesive members that exhibits adhesion as a result of application of heat and pressure. A reason for this is that the outer package film 10 and the battery device 20 are easily and firmly adhered to each other via the fixing tape 50.

Specific examples of the heat adhesive member include an oriented polystyrene tape and a hot-melt tape. The oriented polystyrene tape is a tape-shaped adhesive member in which polystyrene is extended in a predetermined direction, and specific examples thereof include an OPS (registered trademark) tape. The hot-melt tape is an adhesive member which exhibits adhesion mainly resulting from melting of an adhesive component at a heating temperature that is within a range from 80° C. to 100° C. both inclusive.

The oriented polystyrene tape is not particularly limited in configuration. Specifically, the oriented polystyrene tape has a structure in which a base layer including oriented polystyrene and an adhesive layer are stacked on each other. The base layer may be single-layered or multi-layered as long as the base layer includes oriented polystyrene. A thickness of the oriented polystyrene tape is not particularly limited, and may thus be set as desired.

The hot-melt tape is not particularly limited in configuration. Specifically, the hot-melt tape has a structure in which a hot-melt adhesive layer and a base layer are stacked on each other. A polymer compound included in the hot-melt adhesive layer is not particularly limited in kind. Specifically, the hot-melt adhesive layer includes one or more of polymer compounds including, without limitation, a styrene-isoprene-styrene blocked copolymer (SIS), an ethylene-vinyl acetate copolymer (EVA), a polyolefin elastomer (POE), a styrene-butadiene block rubber (SBS), a styrene-based thermoplastic elastomer (SEBS), polyurethane (PU), and amorphous poly alpha olefin (APAO). The styrene-based thermoplastic elastomer is a material having a basic unit structure in which a polystyrene portion and a soft polyethylene-polybutylene portion are block-copolymerized. A thickness of the hot-melt tape is not particularly limited, and may thus be set as desired.

Note that the hot-melt tape may have a structure in which a hot-melt adhesive layer, a base layer, and a hot-melt adhesive layer are stacked on each other in this order. The hot-melt tape may also have a structure in which a hot-melt adhesive layer, a base layer, and an adhesive layer are stacked on each other in this order. The adhesive layer is a rubber-based adhesive layer including, for example, a common rubber-based sticking material. The details of the adhesive layer described here similarly apply to the following description.

A state in which the fixing tape 50 is provided, i.e., a range of provision of the fixing tape 50, is not particularly limited as long as the fixing tape 50 is disposed inside each of the regions R1 and R2. In particular, it is preferable that the fixing tape 50 extend in the leading-out direction D2 as with each of the positive electrode lead 31 and the negative electrode lead 32. A reason for this is that this allows an area of provision of the fixing tape 50 to be increased while avoiding deviation of the fixing tape 50 from each of the regions R1 and R2, and more specifically, avoiding extension of the range of provision of the fixing tape 50 into the region R3, thus making it easier for the battery device 20 to be firmly fixed to the outer package film 10 via the fixing tape 50.

Note that a relationship between a dimension, i.e., a length L1, of the battery device 20 in the leading-out direction D2 and a dimension, i.e., a length L2, of the fixing tape 50 in the leading-out direction D2 satisfies a predetermined condition. Specifically, a proportion of the length L2 of the fixing tape 50 to the length L1 of the battery device 20 is within a range from 50% to 100% both inclusive. A reason for this is that the area of provision of the fixing tape 50 is sufficiently increased, thus allowing the battery device 20 to be sufficiently fixed to the outer package film 10 via the fixing tape 50. The proportion is calculated by the following expression: proportion (%)=(L2/L1)×100. FIG. 5 illustrates a case where the proportion is 90%.

Note that the length L2 of one fixing tape 50 and the length L2 of the other fixing tape 50 may be the same as or different from each other.

A dimension (a width) of the fixing tape 50 in a direction (the X-axis direction) intersecting the leading-out direction D2 (the Y-axis direction) is not particularly limited as long as the fixing tape 50 is within each of the regions R1 and R2. Here, the width of the fixing tape 50 is smaller than a width of each of the regions R1 and R2. Note that the width of one fixing tape 50 and the width of the other fixing tape 50 may be the same as or different from each other.

Needless to say, a planar shape of the fixing tape 50 is not particularly limited. Here, the planar shape of the fixing tape 50 is rectangular, as illustrated in FIG. 5. Note that the planar shape of one fixing tape 50 and the planar shape of the other fixing tape 50 may be the same as or different from each other.

As illustrated in FIGS. 5 and 7, the correcting tape 60 is a tape-shaped correcting member attached to the battery device 20 in order to maintain (correct) the three-dimensional shape (the elongated shape) of the battery device 20. The correcting tape 60 has an adhesive layer (an adhesive surface) on one surface, and is attached to the battery device 20 on the adhesive surface.

In a fabrication process of the battery device 20, a wound body is formed, and is thereafter pressed (shaped) into the elongated shape, as will be described later. The correcting tape 60 is thus attached to the battery device 20 in order to prevent the battery device 20 from being deformed (that is, from restoring the original shape) in a direction opposite to the direction of pressing. The correcting tape 60 has one end part 60A (a first end part) and another end part 60B (a second end part), and extends from the one end part 60A to the other end part 60B in a direction along the minor axis J2. The correcting tape 60 is fixed to the battery device 20 at each of the one end part 60A and the other end part 60B. However, the extending direction of the correcting tape 60 may be inclined with respect to the minor axis J2.

Specifically, as illustrated in FIG. 7, the battery device 20 has a top surface M1 and a bottom surface M2 facing away from each other and a side surface M3 between the top surface M1 and the bottom surface M2. The side surface M3 is one side surface of the battery device 20 in a direction (the Y-axis direction) intersecting the winding direction D1.

As illustrated in FIG. 7, the correcting tape 60 includes the one end part 60A and the other end part 60B, and also includes an intermediate part 60C between the one end part 60A and the other end part 60B. The intermediate part 60C is coupled to the one end part 60A at one end and to the other end part 60B at the other end.

In this case, the correcting tape 60 has the one end part 60A adhered to the top surface M1 and the other end part 60B adhered to the bottom surface M2 while the intermediate part 60C is adjacent to the side surface M3. In other words, the correcting tape 60 is bent along the top surface M1 at one end and is bent along the bottom surface M2 at the other end. However, the intermediate part 60C may be separated from the side surface M3. The correcting tape 60 is thus fixed to the battery device 20 via the one end part 60A and the other end part 60B. As a result, the battery device 20 is corrected in such a manner as not to be deformed with use of the correcting tape 60, as described above. Accordingly, the elongated shape of the battery device 20 is maintained with use of the correcting tape 60.

The number of the correcting tapes 60 to be provided is not particularly limited, and may thus be set as desired. Here, the secondary battery includes three correcting tapes 60 as illustrated in FIG. 5. In FIG. 5, the correcting tape 60 is shaded darker than the regions R1 to R3.

A first correcting tape 60 is disposed on a side closer to the positive electrode lead 31 and the negative electrode lead 32 in a direction (the Y-axis direction) intersecting the winding direction D1, and more specifically, is disposed between the positive electrode lead 31 and the negative electrode lead 32 (the region R3).

A second correcting tape 60 and a third correcting tape 60 are each disposed on a side farther from the positive electrode lead 31 and the negative electrode lead 32 in a direction (the Y-axis direction) intersecting the winding direction D1, and are separated from each other. Here, the second correcting tape 60 lies from the region R1 to region R3, and the third correcting tape 60 lies from the region R2 to the region R3.

The location where the correcting tape 60 is disposed is not particularly limited, and may thus be set as desired.

In particular, the correcting tape 60 is preferably attached to the battery device 20 at a location other than respective locations where the positive electrode lead 31 and the negative electrode lead 32 are coupled to the battery device 20. A reason for this is that the correcting tape 60 is attached to the battery device 20 without being interrupted by the positive electrode lead 31 and the negative electrode lead 32, which allows the battery device 20 to be sufficiently corrected in such a manner as not to be deformed with use of the correcting tape 60. Another reason for this is that an increase in a thickness of the secondary battery due to the presence of the correcting tape 60 is prevented and that, when the secondary battery generates heat, an excessive increase in temperature of the secondary battery due to the presence of the correcting tape 60 is suppressed.

Accordingly, the first correcting tape 60 is attached to the battery device 20 in a location other than the respective locations where the positive electrode lead 31 and the negative electrode lead 32 are coupled to the battery device 20, i.e., in the region R3.

Further, the correcting tape 60 is preferably attached to the battery device 20 in such a manner as not to overlap with the fixing tape 50. A reason for this is that the outer package film 10 and the battery device 20 are adhered to each other via the fixing tape 50 without being interrupted by the correcting tape 60. Another reason for this is that the increase in the thickness of the secondary battery due to the presence of the correcting tape 60 is prevented.

Accordingly, the second correcting tape 60 is attached to the battery device 20 in such a manner as not to overlap with the fixing tape 50 disposed in the region R1, and the third battery device 20 is attached to the battery device 20 in such a manner as not to overlap with the fixing tape 50 disposed in the region R2.

A configuration of the correcting tape 60 is not particularly limited. Specifically, the correcting tape 60 has a structure in which a base layer and an adhesive layer are stacked on each other. Specific examples of the correcting tape 60 include a polyethylene terephthalate (PET) tape and a polypropylene (PP) tape.

Upon charging the secondary battery, in the battery device 20, lithium is extracted from the positive electrode 21, and the extracted lithium is inserted into the negative electrode 22 via the electrolytic solution. Upon discharging the secondary battery, in the battery device 20, lithium is extracted from the negative electrode 22, and the extracted lithium is inserted into the positive electrode 21 via the electrolytic solution. Upon charging and discharging the secondary battery, lithium is inserted and extracted in an ionic state.

In a case of manufacturing the secondary battery, the positive electrode 21 and the negative electrode 22 are fabricated and the electrolytic solution is prepared, following which the secondary battery is fabricated using the positive electrode 21, the negative electrode 22, and the electrolytic solution, according to a procedure to be described below. Here, one end is open, and thus, the outer package film 10 (not illustrated) having an opening at the one end is used. In the following, reference is made to FIGS. 1 to 7 which have already been described.

The positive electrode active material is mixed with materials including, without limitation, the positive electrode binder and the positive electrode conductor to thereby obtain a positive electrode mixture. Thereafter, the positive electrode mixture is put into a solvent such as an organic solvent to thereby prepare a paste positive electrode mixture slurry. Thereafter, the positive electrode mixture slurry is applied on the two opposed surfaces of the positive electrode current collector 21A to thereby form the positive electrode active material layers 21B. After forming the positive electrode active material layers 21B, the positive electrode active material layers 21B may be compression-molded by means of, for example, a roll pressing machine. In this case, the positive electrode active material layers 21B may be heated. The positive electrode active material layers 21B may be compression-molded multiple times. The positive electrode active material layers 21B are thus formed on the respective two opposed surfaces of the positive electrode current collector 21A. In this manner, the positive electrode 21 is fabricated.

In a case of fabricating the positive electrode 21, a range of formation of the positive electrode active material layer 21B is adjusted in such a manner that the surface F1 on the outer side of the winding of the positive electrode current collector 21A is exposed in the positive electrode 21 of the outermost wind when the battery device 20 is fabricated in a later process, as described above.

The negative electrode active material layers 22B are formed on the respective two opposed surfaces of the negative electrode current collector 22A by a procedure similar to the fabrication procedure of the positive electrode 21 described above. Specifically, the negative electrode active material is mixed with materials including, without limitation, the negative electrode binder and the negative electrode conductor to thereby obtain a negative electrode mixture. Thereafter, the negative electrode mixture is put into a solvent such as an organic solvent to thereby prepare a paste negative electrode mixture slurry. Thereafter, the negative electrode mixture slurry is applied on the two opposed surfaces of the negative electrode current collector 22A to thereby form the negative electrode active material layers 22B. Thereafter, the negative electrode active material layers 22B may be compression-molded. The negative electrode active material layers 22B are thus formed on the respective two opposed surfaces of the negative electrode current collector 22A. In this manner, the negative electrode 22 is fabricated.

The electrolyte salt is put into the solvent. The electrolyte salt is thereby dispersed or dissolved in the solvent. As a result, the electrolytic solution is prepared.

First, the positive electrode lead 31 is coupled to the positive electrode 21 (the positive electrode current collector 21A) in such a manner as to extend in the leading-out direction D2 by a method such as a welding method, and the negative electrode lead 32 is coupled to the negative electrode 22 (the negative electrode current collector 22A) in such a manner as to extend in the leading-out direction D2 by a method such as a welding method.

Thereafter, the positive electrode 21 and the negative electrode 22 are stacked on each other with the separator 23 interposed therebetween, following which the stack of the positive electrode 21, the negative electrode 22, and the separator 23 is wound about the winding axis P in the winding direction D1 to thereby fabricate a wound body. The wound body has a configuration similar to that of the battery device 20 except that the positive electrode 21, the negative electrode 22, and the separator 23 are each not impregnated with the electrolytic solution. In this case, the positive electrode 21 and the negative electrode 22 are wound in such a manner that the positive electrode 21 is disposed in the outermost wind to expose the surface F1 on the outer side of the winding of the positive electrode current collector 21A in the positive electrode 21 of the outermost wind, as described above. Thereafter, the wound body is pressed by means of, for example, a pressing machine to thereby shape the wound body into an elongated shape. The positive electrode lead 31 and the negative electrode lead 32 are each coupled to the wound body (the positive electrode 21 and the negative electrode 22, respectively), as described above.

Thereafter, the fixing tape 50 and the correcting tape 60 are attached to the wound body. In this case, when the battery device 20 is fabricated in a later process, the length L2 of the fixing tape 50 is adjusted in such a manner that the proportion of the length L2 of the fixing tape 50 to the length L1 of the battery device 20 is within the range from 50% to 100% both inclusive. Here, two fixing tapes 50 and three correcting tapes 60 are attached to the wound body, as described above.

Thereafter, the wound body is placed inside the outer package film 10 through the opening, following which the electrolytic solution is injected into the outer package film 10 through the opening. Thereafter, portions of the outer package film 10 (the fusion-bonding layer) opposed to each other at the opening are thermal-fusion-bonded to each other by a thermal-fusion-bonding method. In this case, the positive electrode lead 31 and the negative electrode lead 32 are each led out to an outside of the outer package film 10. Further, the sealing film 41 is interposed between the outer package film 10 and the positive electrode lead 31, and the sealing film 42 is interposed between the outer package film 10 and the negative electrode lead 32. The wound body is thereby impregnated with the electrolytic solution, and the battery device 20 which is the wound electrode body is thus fabricated. Also, the outer package film 10 is thereby sealed, and the battery device 20 is thus sealed inside the outer package film 10.

Lastly, with use of, for example, a heat pressing machine, pressure is applied to the secondary battery under heating at the location where the fixing tape 50 is disposed. Various conditions including, for example, a temperature at a time of the heating and a pressure at a time of the pressure application are set as desired. As a result, the outer package film 10 and the battery device 20 are adhered to each other via the fixing tape 50, and the battery device 20 is fixed to the outer package film 10 via the fixing tape 50. The secondary battery is thus assembled with use of the fixing tape 50.

The assembled secondary battery is charged and discharged. Various conditions including, for example, an environment temperature, the number of times of charging and discharging (the number of cycles), and charging and discharging conditions may be set as desired. This process forms a film on a surface of, for example, the negative electrode 22. This brings the secondary battery into an electrochemically stable state.

The secondary battery including the outer package film 10, that is, the secondary battery of the laminated-film type, is thus completed.

According to the secondary battery, the battery device 20 having the elongated shape is contained inside the outer package film 10 having flexibility, and the fixing tape 50 is disposed between the outer package film 10 and the battery device 20. The fixing tape 50 is not disposed in the region R3 and is disposed in each of the regions R1 and R2. The fixing tape 50 is thus adhered to each of the outer package film 10 and the battery device 20. The proportion of the length L2 of the fixing tape 50 to the length L1 of the battery device 20 is within the range from 50% to 100% both inclusive. The positive electrode 21 and the negative electrode 22 are wound in such a manner that the positive electrode 21 is disposed in the outermost wind, and the positive electrode 21 of the outermost wind is not provided with the positive electrode active material layer 21B on the surface F1 on the outer side of the winding and is provided with the positive electrode active material layer 21B on the surface F2 on the inner side of the winding. Accordingly, it is possible to achieve superior physical durability and superior safety while securing energy density for reasons described below.

Here, action and effects of the secondary battery according to an embodiment will be described in comparison with respective secondary batteries according to first to eighth comparative examples to be described later.

Figure 8:
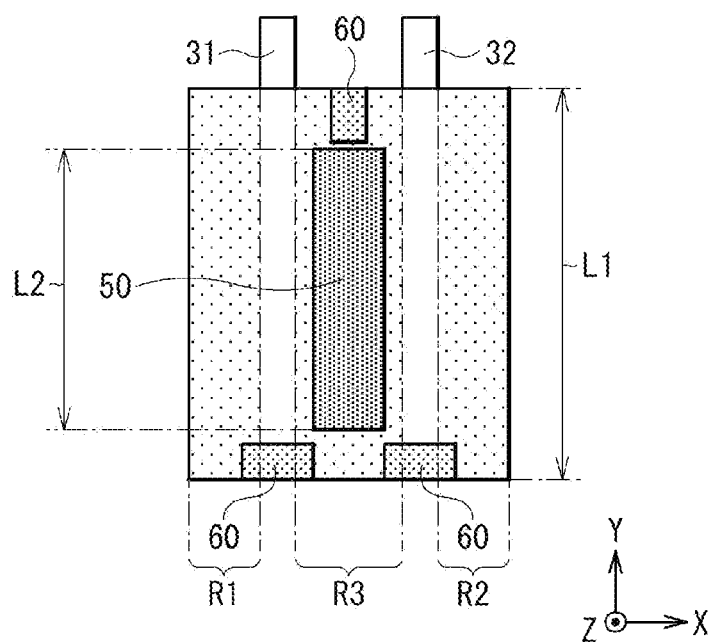
FIG. 8 is a plan view of a configuration of a secondary battery according to a first comparative example.
Figure 9:
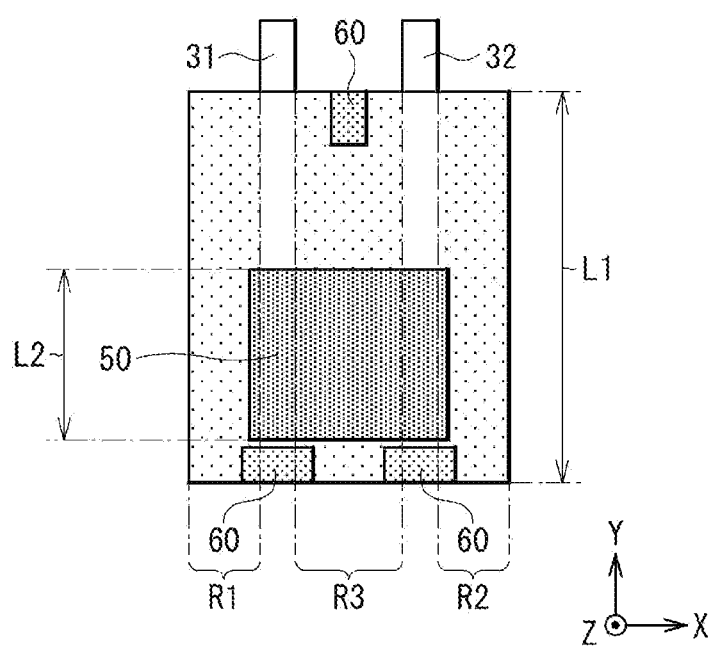
FIG. 9 is a plan view of a configuration of a secondary battery according to a second comparative example.
Figure 10:
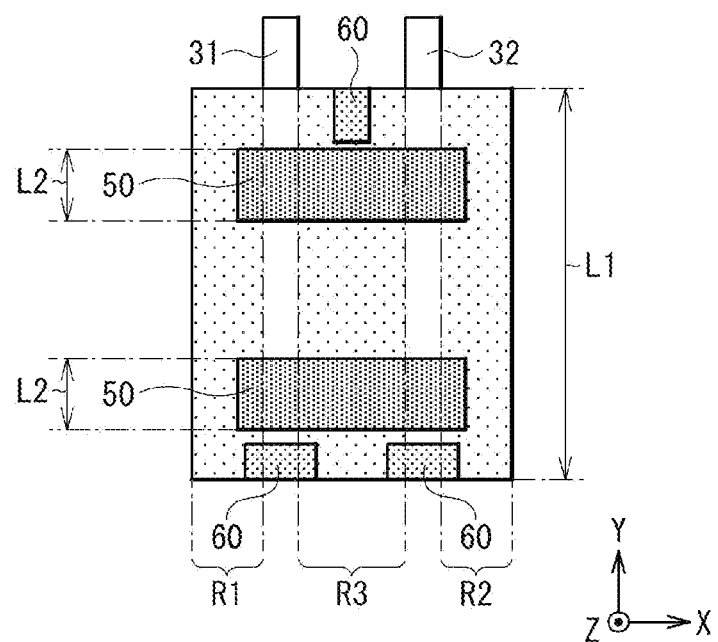
FIG. 10 is a plan view of a configuration of a secondary battery according to a third comparative example.
Figure 11:
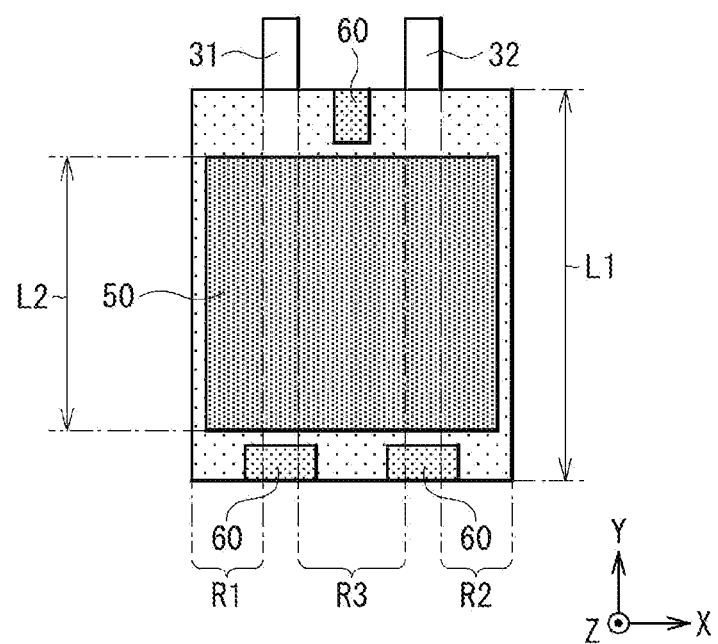
FIG. 11 is a plan view of a configuration of a secondary battery according to a fourth comparative example.
Figure 12:
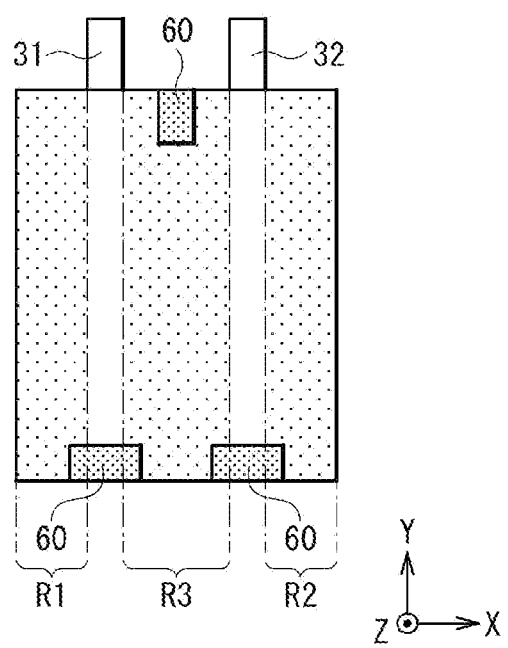
FIG. 12 is a plan view of a configuration of a secondary battery according to a fifth comparative example.
Figure 13:
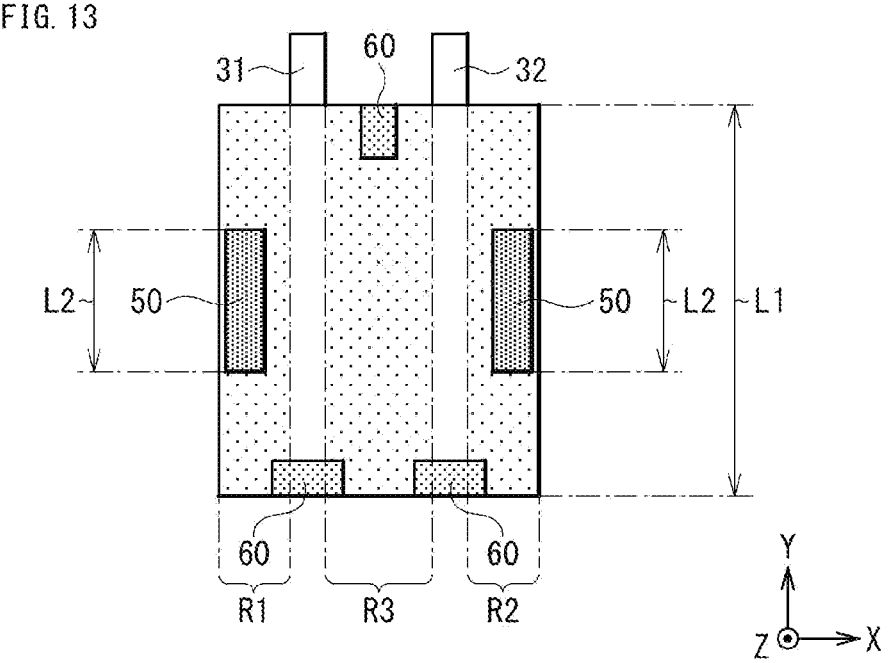
FIG. 13 is a plan view of a configuration (a proportion=30%) of a secondary battery according to a sixth comparative example.
Figure 14:
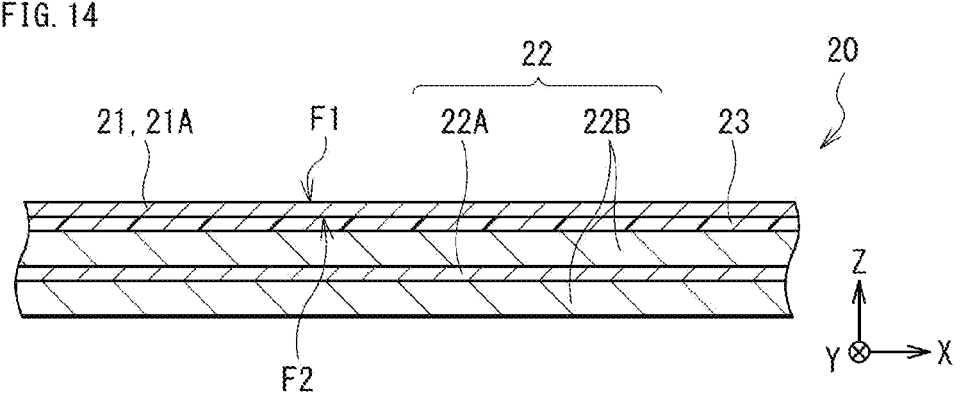
FIG. 14 is a sectional view of a configuration of a secondary battery (a battery device) according to a seventh comparative example.

FIG. 8 illustrates a planar configuration of a secondary battery according to the first comparative example, and corresponds to FIG. 5. FIG. 9 illustrates a planar configuration of a secondary battery according to the second comparative example, and corresponds to FIG. 5. FIG. 10 illustrates a planar configuration of a secondary battery according to the third comparative example, and corresponds to FIG. 5. FIG. 11 illustrates a planar configuration of a secondary battery according to the fourth comparative example, and corresponds to FIG. 5. FIG. 12 illustrates a planar configuration of a secondary battery according to the fifth comparative example, and corresponds to FIG. 5. FIG. 13 illustrates a sectional configuration of a secondary battery according to the sixth comparative example, and corresponds to FIG. 5. FIG. 14 illustrates a sectional configuration of a secondary battery (a battery device 20) according to the seventh comparative example, and corresponds to FIG. 4.

The respective secondary batteries according to the first to eighth comparative examples each have a configuration similar to the configuration of the secondary battery according to an embodiment except for the following.

As illustrated in FIG. 8, the secondary battery according to the first comparative example includes one fixing tape 50 having a large length L2 and disposed in the region R3. As illustrated in FIG. 9, the secondary battery according to the second comparative example includes one fixing tape 50 having a small length L2 and lying from the region R3 to each of the regions R1 and R2. As illustrated in FIG. 10, the secondary battery according to the third comparative example includes two fixing tapes 50 each having a small length L2 and lying from the region R3 to each of the regions R1 and R2. As illustrated in FIG. 11, the secondary battery according to the fourth comparative example includes one fixing tape 50 having a large length L2 and lying from the region R3 to each of the regions R1 and R2. As illustrated in FIG. 12, the secondary battery according to the fifth comparative example includes no fixing tape 50 in the battery device 20. The battery device 20 is thus not fixed to the outer package film 10.

As illustrated in FIG. 13, the secondary battery according to the sixth comparative example has a proportion to be determined in accordance with the length L2 of the fixing tape 50 of 30%, and thus does not satisfy the condition that the proportion is within the range from 50% to 100% both inclusive. As illustrated in FIG. 14, the secondary battery according to the seventh comparative example is provided with no positive electrode active material layer 21B on the surface F1 on the outer side of the winding of the positive electrode current collector 21A in the positive electrode 21 of the outermost wind, and is provided with no positive electrode active material layer 21B also on the surface F2 on the inner side of the winding of the positive electrode current collector 21A in the positive electrode 21 of the outermost wind.

Although not specifically illustrated here, in the secondary battery according to the eighth comparative example, the positive electrode 21 and the negative electrode 22 are wound in such a manner that the separator 23 is on the outer side of the winding. That is, in the battery device 20, neither the positive electrode 21 nor the negative electrode 22 is disposed in the outermost wind, but the separator 23 is disposed in the outermost wind.

As illustrated in FIG. 5, in the secondary battery according to an embodiment, the positive electrode lead 31 and the negative electrode lead 32 are each coupled to the battery device 20 (the wound electrode body), and the battery device 20 is contained inside the outer package film 10 having flexibility. In such a case, the position of the battery device 20 fixed to the outer package film 10 is made appropriate with use of the fixing tape 50. Moreover, the proportion of the length L2 of the fixing tape 50 to the length L1 of the battery device 20 is made appropriate, and a state of the positive electrode 21 disposed in the outermost wind (presence or absence of the positive electrode active material layer 21B on the surface F2 on the inner side of the winding) is also made appropriate.

Accordingly, first, no fixing tape 50 is disposed in the region R3 which has an influence on the thickness (the maximum dimension in the Z-axis direction) of the secondary battery. This reduces the thickness of the secondary battery, i.e., secures the small thickness of the secondary battery.

In more detail, the section of the battery device 20 has an elongated, substantially elliptical shape, as described above. Thus, as illustrated in FIG. 6, the surface of battery device 20 is substantially flat in the region R3, whereas the surface of the battery device 20 is curved in such a manner as to gradually drop as the surface is farther away from the region R3 in each of the regions R1 and R2.

As illustrated in FIGS. 8 to 11, the respective secondary batteries according to the first to fourth comparative examples each include the fixing tape 50 disposed in the region R3. In such a case, the fixing tape 50 disposed in the region R3 tends to have an influence on the thickness of the secondary battery. The presence of the fixing tape 50 thus makes it easier to increase the thickness of the secondary battery. In contrast, in the secondary battery according to an embodiment, as illustrated in FIG. 5, the fixing tape 50 is not disposed in the region R3 but is disposed in each of the regions R1 and R2. In this case, the fixing tape 50 disposed in each of the regions R1 and R2 hardly has an influence on the thickness of the secondary battery, which prevents the thickness of the secondary battery from increasing easily even if the fixing tape 50 is used.

Accordingly, in the secondary battery of an embodiment in which the fixing tape 50 is not disposed in the region R3 but is disposed in each of the regions R1 and R2, the thickness is small even if the fixing tape 50 that does not contribute to charging and discharging reactions is used, as compared with the respective secondary batteries according to the first to fourth comparative examples each including the fixing tape 50 that is disposed in the region R3. This increases energy density per unit volume, even if the secondary battery includes the fixing tape 50.

Second, the fixing tape 50 is disposed in each of the regions R1 and R2 that are not deformed easily even if the outer package film 10 is subjected to an external force. This prevents the battery device 20 from being damaged easily when the secondary battery is subjected to an external force upon being dropped, for example.

In more detail, the battery device 20 is contained inside the outer package film 10, as described above. Accordingly, if the secondary battery undergoes a shock upon being dropped, for example, the battery device 20 can move inside the outer package film 10 due to the shock.

As illustrated in FIG. 12, the secondary battery according to the fifth comparative example includes no fixing tape 50. The battery device 20 is thus not fixed to the outer package film 10. In this case, it becomes easier for the battery device 20 to move violently inside the outer package film 10 due to a shock, and the battery device 20 is thus damaged easily.

Further, as illustrated in FIGS. 8 to 11, the respective secondary batteries according to the first to fourth comparative examples each include the fixing tape 50. The battery device 20 is thus fixed to the outer package film 10 via the fixing tape 50. However, the fixing tape 50 is disposed in the region R3 in which the outer package film 10 is deformed easily in response to movement of the battery device 20. In this case, if the outer package film 10 deforms in the region R3 due to a shock, the battery device 20 can move in response to the deformation of the outer package film 10. In particular, in the secondary battery according to the first comparative example including one fixing tape 50 disposed in the region R3, it becomes easier for the outer package film 10 to be deformed markedly in the region R3 due to a shock, which also makes it easier for the battery device 20 to move markedly. As a result, it still becomes easier for the battery device 20 inside the outer package film 10 to move violently due to the shock. The battery device 20 is thus damaged easily.

In contrast, as illustrated in FIG. 5, the secondary battery according to an embodiment includes the fixing tape 50 disposed in each of the regions R1 and R2 in which the outer package film 10 is not easily deformable in response to movement of the battery device 20. In this case, the outer package film 10 resists being deformed upon a shock in each of the regions R1 and R2, which prevents the battery device 20 from moving easily. In particular, disposing the fixing tape 50 in each of the regions R1 and R2 allows the battery device 20 to be fixed to the outer package film 10 at two locations. The outer package film 10 is thus prevented from being easily deformed markedly even upon undergoing a shock in the region R3. This prevents also the battery device 20 from easily moving markedly. As a result, the battery device 20 is stably and sufficiently prevented from moving easily even if the battery device 20 undergoes a shock inside the outer package film 10, and is thus prevented from being damaged easily.

Accordingly, in the secondary battery of an embodiment in which the fixing tape 50 is not disposed in the region R3 but is disposed in each of the regions R1 and R2, a probability that damage will occur to the battery device 20 decreases and improved physical durability upon a drop, for example, is thus achieved, as compared with the respective secondary batteries according to the first to fourth comparative examples each including the fixing tape 50 that is disposed in the region R3, and with the secondary battery according to the fifth comparative example including no fixing tape 50.

Third, the fixing tape 50 is disposed in each of the regions R1 and R2 that are away from the center of the battery device 20. This prevents temperature of the secondary battery from increasing even if the secondary battery generates heat upon charging and discharging.

In more detail, the charging and discharging reactions proceed in the battery device 20 as described above. Accordingly, the temperature of the battery device 20 increases due to the heat generation during charging and discharging. In this case, in particular, the temperature of the battery device 20 which is the wound electrode body increases easily in the region R3 that is close to the center of heat generation as compared with the regions R1 and R2 that are far from the center of heat generation.

As illustrated in FIGS. 8 to 11, the respective secondary batteries according to the first to fourth comparative examples each include the fixing tape 50 in the region R3. The surface of the battery device 20 is thus covered with the fixing tape 50 in the region R3 that is close to the center of heat generation. In this case, it is difficult for the heat occurring due to the heat generation to be released (dissipated) to the outside of the battery device 20, and it is thus easier for the secondary battery to increase in temperature. In particular, with an increase in a size of the fixing tape 50, i.e., an area on the surface of the battery device 20 covered with the fixing tape 50, the temperature of the secondary battery increases more easily.

In contrast, as illustrated in FIG. 5, the secondary battery according to an embodiment includes the fixing tape 50 in each of the regions R1 and R2. The surface of the battery device 20 is thus covered with the fixing tape 50 in each of the regions R1 and R2 that are far from the center of heat generation. In this case, the heat occurring due to the heat generation is easily released (dissipated) to the outside of the battery device 20 without being interrupted by the fixing tape 50 in the region R3. This prevents the temperature of the secondary battery from increasing easily.

Accordingly, in the secondary battery of an embodiment in which the fixing tape 50 is not disposed in the region R3 but is disposed in each of the regions R1 and R2, the temperature is prevented from increasing easily upon heat generation of the battery device 20, and safety during use thus improves, as compared with the respective secondary batteries according to the first to fourth comparative examples each including the fixing tape 50 that is disposed in the region R3.

Fourth, the proportion of the length L2 of the fixing tape 50 to the length L1 of the battery device 20 is within the range from 50% to 100% both inclusive. This prevents the battery device 20 from falling off from the outer package film 10 easily even if the secondary battery undergoes a shock.

In more detail, an adhesive force of the battery device 20 to the outer package film 10 via the fixing tape 50 is varied depending on the proportion described above, and the proportion is determined in accordance with the length L2 of the fixing tape 50.

As illustrated in FIG. 13, in the secondary battery according to the sixth comparative example, the proportion is too small due to the fact that the length L2 is too small, and thus the condition that the proportion is within the range from 50% to 100% both inclusive is not satisfied. In this case, the area of provision of the fixing tape 50 is insufficient and thus the adhesive force of the battery device 20 to the outer package film 10 is also insufficient. This makes it difficult for the battery device 20 to be sufficiently fixed to the outer package film 10. As a result, the battery device 20 easily falls off from the outer package film 10 if the secondary battery undergoes a shock.

In contrast, as illustrated in FIG. 5, the secondary battery according to an embodiment has a sufficiently large proportion due to the fact that the length L2 is sufficiently large, and thus satisfies the condition that the proportion is within the range from 50% to 100% both inclusive. In this case, the area of provision of the fixing tape 50 is secured and thus the adhesive force of the battery device 20 to the outer package film 10 is also secured. This makes it sufficiently easier for the battery device 20 to be fixed to the outer package film 10. As a result, the battery device 20 is prevented from falling off from the outer package film 10 easily even if the secondary battery undergoes a shock.

Accordingly, in the secondary battery of an embodiment which satisfies the condition that the proportion is within the range from 50% to 100% both inclusive, the battery device 20 is prevented from falling off easily even if the secondary battery undergoes a shock, and is thus prevented from being damaged easily, as compared with the secondary battery according to the sixth comparative example that does not satisfy the condition.

Fifth, in the positive electrode 21 of the outermost wind, no positive electrode active material layer 21B is provided on the surface F1 on the outer side of the winding, and the positive electrode active material layer 21B is provided on the surface F2 on the inner side of the winding. The battery device 20 is thus prevented from being damaged easily when the secondary battery is subjected to an external force upon being dropped, for example.

In more detail, whether the secondary battery moves easily inside the outer package film 10 when the secondary battery undergoes a shock upon being dropped, for example, depends on adherence of the positive electrode 21 to the separator 23.

As illustrated in FIG. 14, in the secondary battery according to the seventh comparative example, no positive electrode active material layer 21B is provided on the surface F2 on the inner side of the winding in the positive electrode 21 of the outermost wind, and the positive electrode current collector 21A is thus in direct contact with the separator 23. In this case, the positive electrode 21 (the positive electrode current collector 21A) is not sufficiently adhered to the separator 23, which causes the winding displacement of the positive electrode 21 to occur easily when the secondary battery undergoes a shock. As a result, the battery device 20 moves easily, and is thus damaged easily.

In contrast, as illustrated in FIG. 5, in the secondary battery according to an embodiment, the positive electrode active material layer 21B is provided on the surface F2 on the inner side of the winding in the positive electrode 21 of the outermost wind. The positive electrode current collector 21A is thus in indirect contact with the separator 23 via the positive electrode active material layer 21B. In this case, the positive electrode 21 (the positive electrode current collector 21A) is sufficiently closely attached to the separator 23, which prevents the winding displacement of the positive electrode 21 from occurring easily when the secondary battery undergoes a shock. As a result, the battery device 20 is prevented from moving easily, and is thus prevented from being damaged easily.

Accordingly, in the secondary battery of an embodiment in which the positive electrode active material layer 21B is provided on the surface F2 on the inner side of the winding in the positive electrode 21 of the outermost wind, the battery device 20 is prevented from moving easily even if the secondary battery undergoes a shock, and is thus prevented from being damaged easily, as compared with the secondary battery according to the seventh comparative example in which no positive electrode active material layer 21B is provided on the surface F2 on the inner side of the winding in the positive electrode 21 of the outermost wind.

Sixth, the positive electrode 21 is disposed in the outermost wind of the battery device 20, which prevents the battery device 20 from being damaged easily when the secondary battery is subjected to an external force upon being dropped, for example.

In particular, whether the secondary battery is easily damaged when the secondary battery undergoes a shock upon being dropped, for example, depends on whether the battery device 20 is easily movable inside the outer package film 10.

In the secondary battery according to the eighth comparative example, the separator 23 is disposed in the outermost wind of the battery device 20, which causes the battery device 20 to be easily movable inside the outer package film 10 when the secondary battery undergoes a shock. Accordingly, the battery device 20 will be easily damaged if the secondary battery undergoes a shock.

In contrast, in the secondary battery according to an embodiment, the positive electrode 21 is disposed in the outermost wind of the battery device 20. This prevents the battery device 20 from moving easily inside the outer package film 10 when the secondary battery undergoes a shock. As a result, the battery device 20 is prevented from being damaged easily even if the secondary battery undergoes a shock.

Accordingly, in the secondary battery of an embodiment in which the positive electrode 21 is disposed in the outermost wind of the battery device 20, the battery device 20 is prevented from moving easily even if the secondary battery undergoes a shock, and is thus prevented from being damaged easily, as compared with the secondary battery according to the eighth comparative example in which the separator 23 is disposed in the outermost wind of the battery device 20.

For the above-described reasons, as compared with the respective secondary batteries according to the first to eighth comparative examples, the secondary battery according to an embodiment is not only increased in the energy density per unit volume, but is also improved in the physical durability upon being dropped, for example, and improved in the safety during use. Accordingly, it is possible to achieve superior physical durability and superior safety while ensuring the energy density.

In particular, in the secondary battery according to an embodiment, the fixing tape 50 may include the heat adhesive member that exhibits adhesion as a result of application of heat and pressure. This allows the battery device 20 to be easily and firmly fixed to the outer package film 10 with use of the fixing tape 50. Accordingly, it is possible to achieve higher effects. In this case, the heat adhesive member may include, without limitation, the oriented polystyrene tape. This allows the battery device 20 to be sufficiently fixed to the outer package film 10. Accordingly, it is possible to achieve further higher effects.

Further, the fixing tape 50 may extend in the leading-out direction D2. This helps to firmly fix the battery device 20 to the outer package film 10 via the fixing tape 50 easily. Accordingly, it is possible to achieve higher effects.

Further, the correcting tape 60 that extends in the direction along the minor axis J2 may be attached to the battery device 20 at each of the one end part 60A and the other end part 60B. This allows the elongated shape of the battery device 20 to be maintained with use of the correcting tape 60. The elongated shape (the thickness), etc., of the battery device 20 is thus prevented from being varied easily. Accordingly, it is possible to achieve higher effects. In this case, the correcting tape 60 may be attached to the battery device 20 at a location other than respective locations where the positive electrode lead 31 and the negative electrode lead 32 are coupled to the battery device 20. This allows the battery device 20 to be sufficiently corrected with use of the correcting tape 60 in such a manner as not to be deformed. Accordingly, it is possible to achieve further higher effects. Further, the correcting tape 60 may be attached to the battery device 20 in such a manner as not to be overlapped with the fixing tape 50. This helps to allow the outer package film 10 and the battery device 20 to be adhered easily to each other via the fixing tape 50. Accordingly, it is possible to achieve further higher effects.

Further, the secondary battery may include a lithium-ion secondary battery. This makes it possible to obtain a sufficient battery capacity stably through the use of insertion and extraction of lithium. Accordingly, it is possible to achieve higher effects.

Next, a description is given of modifications of the secondary battery according to an embodiment. The configuration of the secondary battery described above is appropriately modifiable as described below. Note that any two or more of the following series of modifications may be combined with each other.

In FIG. 5, the secondary battery includes one positive electrode lead 31. However, although not specifically illustrated here, the number of positive electrode leads 31 is not particularly limited and may be two or more. In this case, electric resistance of the secondary battery (the battery device 20) decreases as the number of positive electrode leads 31 increases. Accordingly, it is possible to achieve higher effects. Note that, in a case where the secondary battery includes multiple positive electrode leads 31, the regions R1 and R3 are defined with reference to a position of the positive electrode lead 31 disposed on the outermost side (the leftmost side in FIG. 5).

The secondary battery described here regarding the positive electrode lead 31 is also applicable to the negative electrode lead 32. In other words, the number of negative electrode leads 32 may be two or more, and the electric resistance of the secondary battery (the battery device 20) decreases as the number of negative electrode leads 32 increases. In a case where the secondary battery includes multiple negative electrode leads 32, the regions R2 and R3 are defined with reference to a position of the negative electrode lead 32 disposed on the outermost side (the rightmost side in FIG. 5).

Figure 15:
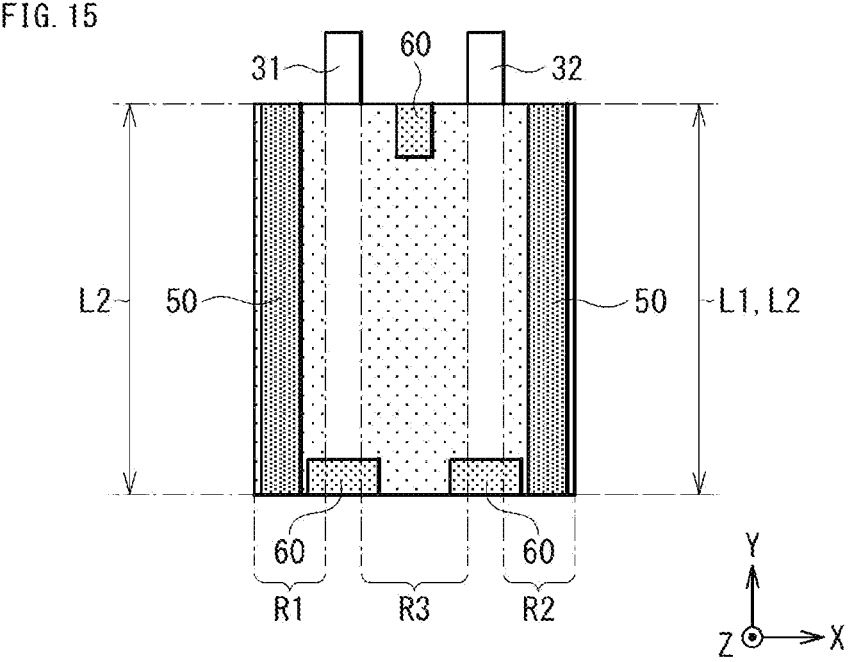
FIG. 15 is a plan view of a configuration (a proportion=100%) of a secondary battery according to an embodiment of the present technology.
Figure 16:
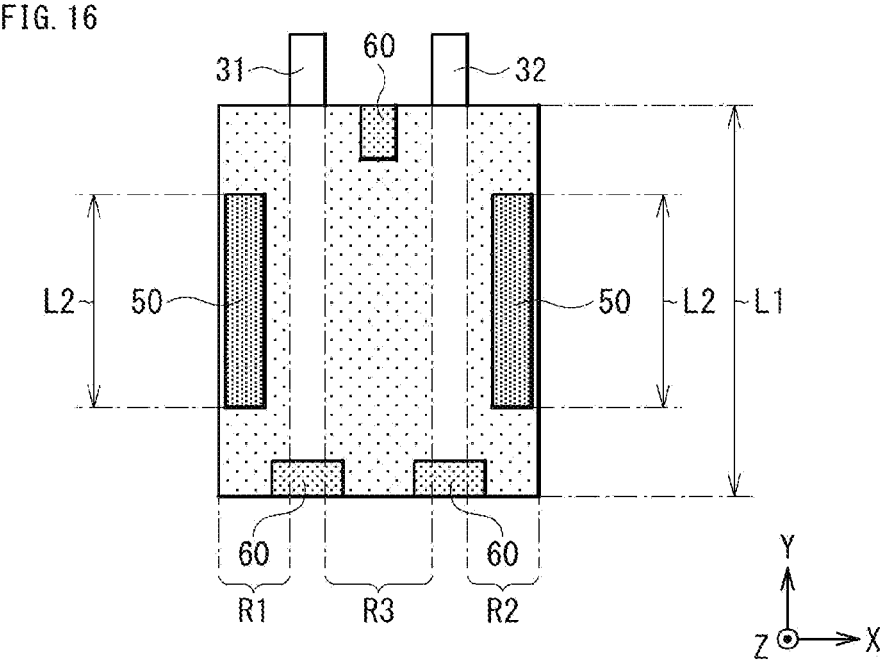
FIG. 16 is a plan view of a configuration (a proportion=50%) of the secondary battery according to an embodiment of the present technology.

In FIG. 5, the proportion to be determined in accordance with the length L2 of the fixing tape 50 is not particularly limited, and may thus be changed as desired. Specifically, as illustrated in each of FIGS. 15 and 16 corresponding to FIG. 5, the proportion may be changed. In FIG. 15, the proportion is 100%. Thus, the length L1 of the battery device 20 is equal to the length L2 of the fixing tape 50. In FIG. 16, the proportion is 50%.

In FIG. 4, the positive electrode 21 and the negative electrode 22 are wound in such a manner that the positive electrode 21 is disposed on the outer side of the winding relative to the negative electrode 22. In such a positive electrode 21 of the outermost wind, no positive electrode active material layer 21B is provided on the surface F1 on the outer side of the winding of the positive electrode current collector 21A, and the surface F1 on the outer side of the winding of the positive electrode current collector 21A is exposed.

Figure 17:
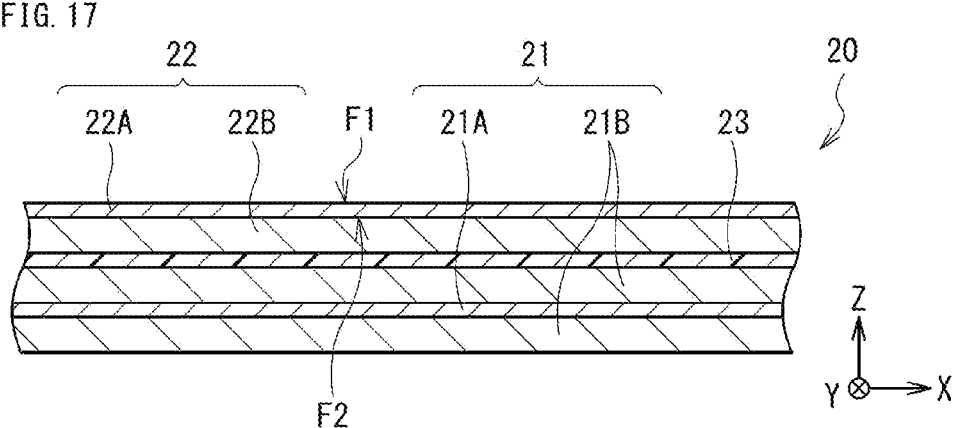
FIG. 17 is a sectional view of a configuration of a secondary battery (a battery device) according to an embodiment of the present technology.

However, as illustrated FIG. 17 corresponding to FIG. 4, the positive electrode 21 and the negative electrode 22 may be wound in such a manner that the negative electrode 22 is disposed on the outer side of the winding relative to the positive electrode 21. In such a negative electrode 22 of the outermost wind: no negative electrode active material layer 22B may be provided on the surface F1 on the outer side of the winding of the negative electrode current collector 22A, and the surface F1 on the outer side of the winding may thus be exposed; and the negative electrode active material layer 22B may be provided on the surface F2 on the inner side of the winding of the negative electrode current collector 22A. In this case also, it is possible to obtain an effect that is similar to an effect to be obtained in the case where the positive electrode 21 of the outermost wind is provided with no positive electrode active material layer 21B on the surface F1 on the outer side of the winding of the positive electrode current collector 21A and is provided with the positive electrode active material layer 21B on the surface F2 on the inner side of the winding of the positive electrode current collector 21A.

Figure 18:
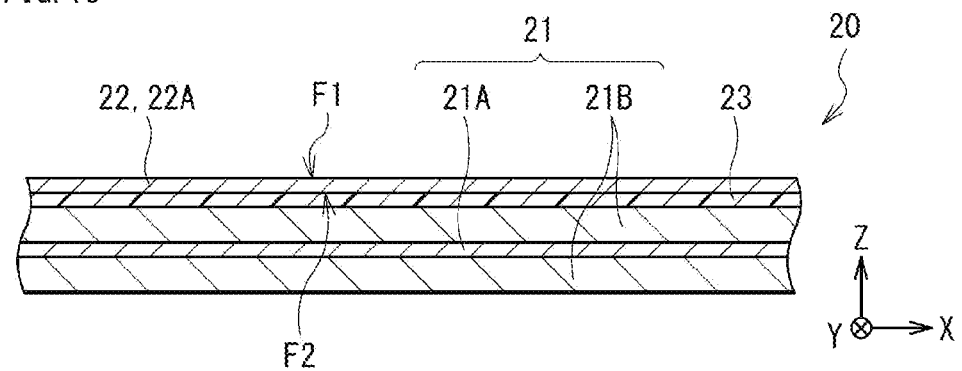
FIG. 18 is a sectional view of a configuration of a secondary battery (a battery device) according to a ninth comparative example.

In other words, as illustrated in FIG. 18 corresponding to FIG. 4, in a secondary battery according to a ninth comparative example in which no negative electrode active material layer 22B is provided on the surface F2 on the inner side of the winding in the negative electrode 22 of the outermost wind, the negative electrode 22 (the negative electrode current collector 22A) is not sufficiently closely attached to the separator 23. This causes winding displacement of the negative electrode 22 to occur easily, and battery device 20 is thus damaged easily.

In contrast, as illustrated in FIG. 17, in the secondary battery according to an embodiment provided with the negative electrode active material layer 22B on the surface F2 on the inner side of the winding in the negative electrode 22 of the outermost wind, the negative electrode 22 (the negative electrode current collector 22A) is sufficiently closely attached to the separator 23. This prevents the winding displacement of the negative electrode 22 from occurring easily. The battery device 20 is thus prevented from being damaged easily.

In FIG. 5, in a case where the secondary battery is viewed from one side (a near side in FIG. 5, that is, a front side) in the thickness direction (the Z-axis direction), the fixing tape 50 is not disposed in the region R3 and is disposed in each of the regions R1 and R2. The secondary battery thus includes with two fixing tapes 50. In other words, the secondary battery includes two fixing tapes 50 disposed in the respective regions R1 and R2 on the front side.

However, although not specifically illustrated here, in a case where the secondary battery is viewed from the other side (a far side in FIG. 5, that is, a back side) in the thickness direction (the Z-axis direction), the fixing tape 50 may not be disposed in the region R3 and may be disposed in each of the regions R1 and R2. The secondary battery may thus include with two fixing tapes 50. In other words, the secondary battery may include two fixing tapes 50 disposed in the respective regions R1 and R2 on the back side. In this case also, similar effects are obtainable.

Needless to say, the secondary battery may include two fixing tapes 50 disposed in the respective regions R1 and R2 on the front side and two fixing tapes 50 disposed in the respective regions R1 and R2 on the back side, thus including four fixing tapes 50 in total. In this case, the battery device 20 is more firmly fixed to the outer package film 10 via the four fixing tapes 50. Accordingly, it is possible to achieve higher effects.

Figure 19:
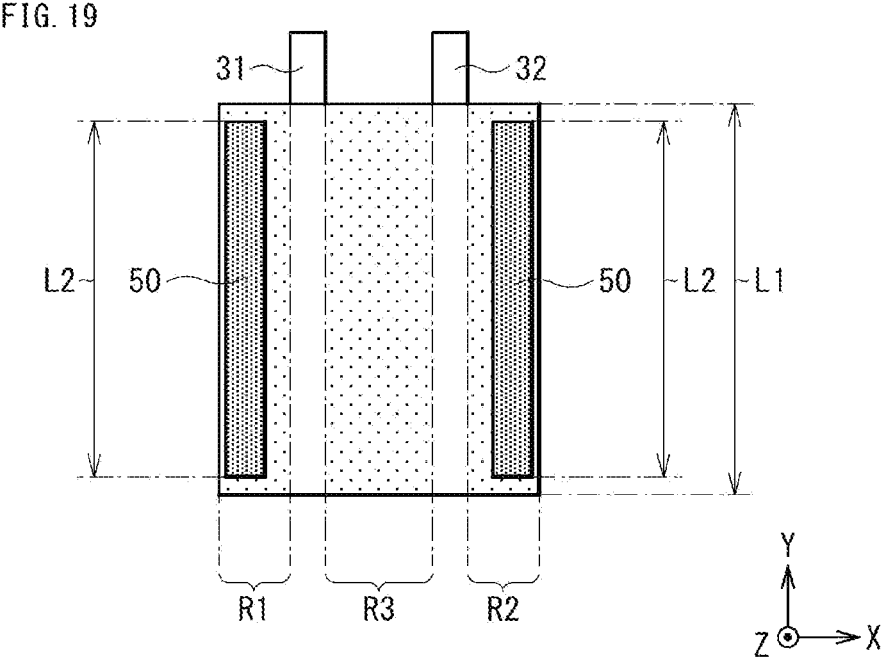
FIG. 19 is a plan view of a configuration of a secondary battery according to an embodiment of the present technology.

In FIG. 5, the secondary battery includes the correcting tape 60 together with the fixing tape 50. However, as illustrated in FIG. 19 corresponding to FIG. 5, the secondary battery may include the fixing tape 50 only, and may thus include no correcting tape 60. Even in such a case, the battery device 20 is fixed to the outer package film 10 with use of the fixing tape 50, and similar effects are thus obtainable.

However, as described above, in order to maintain the elongated shape of the battery device 20, the secondary battery preferably includes the correcting tape 60 together with the fixing tape 50, as illustrated in FIG. 5.

The separator 23 which is a porous film is used. However, although not specifically illustrated here, a separator of a stacked type including a polymer compound layer may be used instead of the separator 23 which is the porous film.

Specifically, the separator of the stacked type includes a porous film having two opposed surfaces, and a polymer compound layer disposed on one of or each of the two opposed surfaces of the porous film. A reason for this is that adherence of the separator to each of the positive electrode 21 and the negative electrode 22 improves to suppress the occurrence of winding displacement of the battery device 20. This helps to prevent the secondary battery from easily swelling even if, for example, a decomposition reaction of the electrolytic solution occurs. The polymer compound layer includes a polymer compound such as polyvinylidene difluoride which has superior physical strength and is electrochemically stable.

Note that the porous film, the polymer compound layer, or both may each include one or more kinds of insulating particles. A reason for this is that such insulating particles dissipate heat upon heat generation by the secondary battery, thus improving safety or heat resistance of the secondary battery. Examples of the insulating particles include inorganic particles and resin particles. Specific examples of the inorganic particles include particles of: aluminum oxide, aluminum nitride, boehmite, silicon oxide, titanium oxide, magnesium oxide, and zirconium oxide. Specific examples of the resin particles include particles of acrylic resin and particles of styrene resin.

In a case of fabricating the separator of the stacked type, a precursor solution including, without limitation, the polymer compound and an organic solvent is prepared, following which the precursor solution is applied on one of or each of the two opposed surfaces of the porous film. In another example, the porous film may be immersed in the precursor solution. In this case, the insulating particles may be added to the precursor solution on an as-needed basis.

In the case where the separator of the stacked type is used also, lithium ions are movable between the positive electrode 21 and the negative electrode 22, and similar effects are therefore obtainable.

The electrolytic solution which is a liquid electrolyte is used. However, although not specifically illustrated here, an electrolyte layer which is a gel electrolyte may be used instead of the electrolytic solution.

In the battery device 20 including the electrolyte layer, the positive electrode 21 and the negative electrode 22 are wound with the separator 23 and the electrolyte layer interposed therebetween. The electrolyte layer is interposed between the positive electrode 21 and the separator 23, and between the negative electrode 22 and the separator 23.

Specifically, the electrolyte layer includes a polymer compound together with the electrolytic solution. The electrolytic solution is held by the polymer compound in the electrolyte layer. A reason for this is that leakage of the electrolytic solution is prevented. The configuration of the electrolytic solution is as described above. The polymer compound includes, for example, polyvinylidene difluoride. In a case of forming the electrolyte layer, a precursor solution including, for example, the electrolytic solution, the polymer compound, and an organic solvent is prepared, following which the precursor solution is applied on one side or both sides of the positive electrode 21 and on one side or both sides of the negative electrode 22.

In a case where the electrolyte layer is used also, lithium ions are movable between the positive electrode 21 and the negative electrode 22 via the electrolyte layer, and similar effects are therefore obtainable.

Next, a description is given of applications (application examples) of the above-described secondary battery according to an embodiment.

The applications of the secondary battery are not particularly limited as long as they are, for example, machines, equipment, instruments, apparatuses, or systems (an assembly of a plurality of pieces of equipment, for example) in which the secondary battery is usable mainly as a driving power source, an electric power storage source for electric power accumulation, or any other source. The secondary battery used as a power source may serve as a main power source or an auxiliary power source. The main power source is preferentially used regardless of the presence of any other power source. The auxiliary power source may be used in place of the main power source, or may be switched from the main power source on an as-needed basis. In a case where the secondary battery is used as the auxiliary power source, the kind of the main power source is not limited to the secondary battery.

Specific examples of the applications of the secondary battery include: electronic equipment including portable electronic equipment; portable life appliances; apparatuses for data storage; electric power tools; battery packs to be mounted as detachable power sources on, for example, laptop personal computers; medical electronic equipment; electric vehicles; and electric power storage systems. Examples of the electronic equipment include video cameras, digital still cameras, mobile phones, laptop personal computers, cordless phones, headphone stereos, portable radios, portable televisions, and portable information terminals. Examples of the portable life appliances include electric shavers. Examples of the apparatuses for data storage include backup power sources and memory cards. Examples of the electric power tools include electric drills and electric saws. Examples of the medical electronic equipment include pacemakers and hearing aids. Examples of the electric vehicles include electric automobiles including hybrid automobiles. Examples of the electric power storage systems include home battery systems for accumulation of electric power for a situation such as emergency. The above-described applications may each use one secondary battery, or may each use multiple secondary batteries.

In particular, the battery pack is each effectively applied to relatively large-sized equipment, etc., including an electric vehicle, an electric power storage system, and an electric power tool. The battery pack may include a single battery, or may include an assembled battery. The electric vehicle is a vehicle that operates (travels) using the secondary battery as a driving power source, and may be an automobile that is additionally provided with a driving source other than the secondary battery as described above, such as a hybrid automobile. The electric power storage system is a system that uses the secondary battery as an electric power storage source. An electric power storage system for home use accumulates electric power in the secondary battery which is an electric power storage source, and the accumulated electric power may thus be utilized for using, for example, home appliances.

Some application examples of the secondary battery will now be described in detail. The configurations of the application examples described below are merely examples, and are appropriately modifiable.

Figure 20:
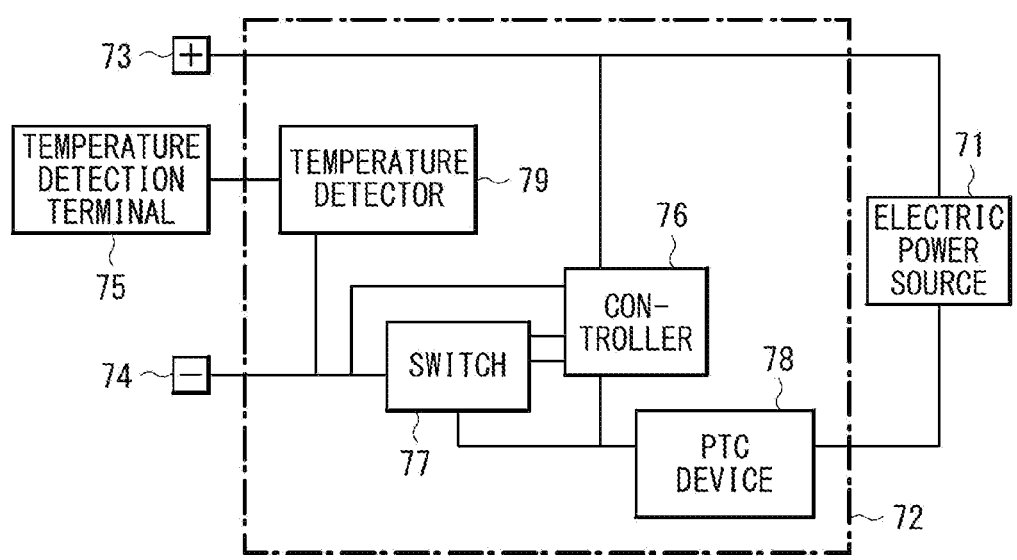
FIG. 20 is a block diagram illustrating a configuration of an application example of the secondary battery.

FIG. 20 illustrates a block configuration of a battery pack. The battery pack described here is a simple battery pack (a so-called soft pack) including one secondary battery, and is to be mounted on, for example, electronic equipment typified by a smartphone.

As illustrated in FIG. 20, the battery pack includes an electric power source 71 and a circuit board 72. The circuit board 72 is coupled to the electric power source 71, and includes a positive electrode terminal 73, a negative electrode terminal 74, and a temperature detection terminal 75. The temperature detection terminal 75 is a so-called T terminal.

The electric power source 71 includes one secondary battery. The secondary battery has a positive electrode lead coupled to the positive electrode terminal 73 and a negative electrode lead coupled to the negative electrode terminal 74. The electric power source 71 is couplable to outside via the positive electrode terminal 73 and the negative electrode terminal 74, and is thus chargeable and dischargeable via the positive electrode terminal 73 and the negative electrode terminal 74. The circuit board 72 includes a controller 76, a switch 77, a thermosensitive resistive device (a positive temperature coefficient (PTC) device) 78, and a temperature detector 79. However, the PTC device 78 may be omitted.

The controller 76 includes, for example, a central processing unit (CPU) and a memory, and controls an overall operation of the battery pack. The controller 76 detects and controls a use state of the electric power source 71 on an as-needed basis.

If a voltage of the electric power source 71 (the secondary battery) reaches an overcharge detection voltage or an overdischarge detection voltage, the controller 76 turns off the switch 77. This prevents a charging current from flowing into a current path of the electric power source 71. In addition, if a large current flows upon charging or discharging, the controller 76 turns off the switch 77 to block the charging current. The overcharge detection voltage and the overdischarge detection voltage are not particularly limited. For example, the overcharge detection voltage is 4.2 V±0.05 V and the overdischarge detection voltage is 2.4 V±0.1 V.

The switch 77 includes, for example, a charge control switch, a discharge control switch, a charging diode, and a discharging diode. The switch 77 performs switching between coupling and decoupling between the electric power source 71 and external equipment in accordance with an instruction from the controller 76. The switch 77 includes, for example, a metal-oxide-semiconductor field-effect transistor (MOSFET). The charging and discharging currents are detected on the basis of an ON-resistance of the switch 77.

The temperature detector 79 includes a temperature detection device such as a thermistor. The temperature detector 79 measures a temperature of the electric power source 71 using the temperature detection terminal 75, and outputs a result of the temperature measurement to the controller 76. The result of the temperature measurement to be obtained by the temperature detector 79 is used, for example, in a case where the controller 76 performs charge/discharge control upon abnormal heat generation or in a case where the controller 76 performs a correction process upon calculating a remaining capacity.

EXAMPLES

A description is given of Examples of the present technology below according to an embodiment.

Experiment Examples 1 to 6 and Comparative Examples 1 to 9

Secondary batteries were fabricated, following which the secondary batteries were each evaluated for their characteristics.
[Fabrication of Secondary Battery]
The secondary batteries of the laminated-film type (the lithium-ion secondary batteries) illustrated in, for example, FIGS. 1 to 7 were each fabricated by the following procedure.
(Fabrication of Positive Electrode)
First, 91 parts by mass of the positive electrode active material ($LiCoO_2$), 3 parts by mass of the positive electrode binder (polyvinylidene difluoride), and 6 parts by mass of the positive electrode conductor (graphite) were mixed with each other to thereby obtain a positive electrode mixture. Thereafter, the positive electrode mixture was put into an organic solvent (N-methyl-2-pyrrolidone), following which the organic solvent was stirred to thereby prepare a paste positive electrode mixture slurry. Thereafter, the positive electrode mixture slurry was applied on the two opposed surfaces of the positive electrode current collector 21A (a strip-shaped aluminum foil having a thickness of 12 μm) by means of a coating apparatus, following which the applied positive electrode mixture slurry was dried to thereby form the positive electrode active material layers 21B. Lastly, the positive electrode active material layers 21B were compression-molded by means of a roll pressing machine. In this manner, the positive electrode active material layers 21B were formed on the respective two opposed surfaces of the positive electrode current collector 21A. Thus, the positive electrode 21 was fabricated.

In a case of fabricating the positive electrode 21, the range of formation of the positive electrode active material layer 21B was adjusted in accordance with whether the positive electrode 21 was to be disposed in the outermost wind when the battery device 20 (the wound body) was fabricated in a later process. Specifically, in a case where the positive electrode 21 was to be disposed in the outermost wind, the positive electrode active material layer 21B was not formed on the surface F1 on the outer side of the winding and was formed only on the surface F2 on the inner side of the winding, of the positive electrode current collector 21A in the positive electrode 21 of the outermost wind. In addition, in a case where the positive electrode 21 was not to be disposed in the outermost wind, the positive electrode active material layer 21B was formed on each of the surface F1 on the outer side of the winding and the surface F2 on the inner side of the winding, of the positive electrode current collector 21A in the positive electrode 21 of the outermost wind.

The column of "outermost wind" in Table 1 indicates the kind of component (the positive electrode 21, the negative electrode 22, or the separator 23) to be disposed in the outermost wind. The column of "active material layer (outer side of winding)" indicates whether the active material layer was formed on the outer side of the winding (the surface F1 on the outer side of the winding) of the electrode disposed in the outermost wind, and the column of "active material layer (inner side of winding)" indicates whether the active material layer was formed on the inner side of the winding (the surface F2 on the inner side of the winding) of the electrode disposed in the outermost wind. The "active material layer" represents the positive electrode active material layer 21B in a case where the electrode to be disposed in the outermost wind was the positive electrode 21, and represents the negative electrode active material layer 22B in a case where the electrode to be disposed in the outermost wind was the negative electrode 22.

(Fabrication of Negative Electrode)

First, 93 parts by mass of the negative electrode active material (artificial graphite), 1.5 parts by mass of the negative electrode binder (a styrene-butadiene rubber), 4 parts by mass of the negative electrode conductor (graphite), and 1.5 parts by mass of a thickener (sodium carboxymethyl cellulose) were mixed with each other, to thereby obtain a negative electrode mixture. Thereafter, the negative electrode mixture was put into an aqueous solvent (pure water), following which the organic solvent was stirred to thereby prepare a paste negative electrode mixture slurry. Thereafter, the negative electrode mixture slurry was applied on the two opposed surfaces of the negative electrode current collector 22A (a strip-shaped copper foil having a thickness of 6 μm) by means of a coating apparatus, following which the applied negative electrode mixture slurry was dried to thereby form the negative electrode active material layers 22B. Lastly, the negative electrode active material layers 22B were compression-molded by means of the roll pressing machine. In this manner, the negative electrode active material layers 22B were formed on the respective two opposed surfaces of the negative electrode current collector 22A. Thus, the negative electrode 22 was fabricated.

In a case of fabricating the negative electrode 22, the range of formation of the negative electrode active material layer 22B was adjusted in accordance with whether the negative electrode 22 was to be disposed in the outermost wind when the battery device 20 (the wound body) was fabricated in a later process. Specifically, in a case where the negative electrode 22 was to be disposed in the outermost wind, the negative electrode active material layer 22B was not formed on the surface F1 on the outer side of the winding and was formed only on the surface F2 on the inner side of the winding, of the negative electrode current collector 22A in the negative electrode 22 of the outermost wind. In addition, in a case where the negative electrode 22 was not to be disposed in the outermost wind, the negative electrode active material layer 22B was formed on each of the surface F1 on the outer side of the winding and the surface F2 on the inner side of the winding, of the negative electrode current collector 22A in the negative electrode 22 of the outermost wind.

Details of items of the respective columns of "outermost wind", "active material layer (outer side of winding)", and "active material layer (inner side of winding)" in Table 1 are as described above.

(Preparation of Electrolytic Solution)

The electrolyte salt (lithium hexafluorophosphate ($LiPF_6$)) was added to the solvent (ethylene carbonate, propylene carbonate, propyl propionate, and ethyl propionate), following which the solvent was stirred. In this case, a mixture ratio (a weight ratio) of the solvent between ethylene carbonate, propylene carbonate, propyl propionate, and ethyl propionate was set to 20:10:60:10, and a content of the electrolyte salt was set to 1 mol/kg with respect to the solvent. The electrolyte salt was thereby dissolved or dispersed in the solvent. As a result, the electrolytic solution was prepared.

(Assembly of Secondary Battery)

First, the positive electrode lead 31 including aluminum was welded to the positive electrode 21 (the positive electrode current collector 21A) in such a manner as to extend in the leading-out direction D2, and the negative electrode lead 32 including nickel was welded to the negative electrode 22 (the negative electrode current collector 22A) in such a manner as to extend in the leading-out direction D2.

Thereafter, the positive electrode 21 and the negative electrode 22 were stacked on each other with the separator 23 (a fine-porous polyethylene film having a thickness of 15 μm) interposed therebetween, following which the stack of the positive electrode 21, the negative electrode 22, and the separator 23 was wound about the winding axis P in the winding direction D1 to thereby fabricate the wound body. In this case, the component to be disposed in the outermost wind of the wound body was adjusted as indicated in Table 1, more specifically, the positive electrode 21, the negative electrode 22, and the separator 23 were wound in such a manner that the positive electrode 21 or the negative electrode 22 was disposed in the outermost wind. Thereafter, the wound body was pressed by means of a pressing machine, and was thereby shaped into an elongated shape.

Thereafter, the fixing tape 50 was attached to wound body. In this case, the configuration of the fixing tape 50 upon the attachment was set to be the configuration indicated in the column of "configuration" in Table 1 (Example 1 to 6). Here, the oriented polystyrene tape (OPS) and the hot-melt tape (HM) were used as the fixing tape 50 as listed in Table 1. The proportion (%) was adjusted by changing the length L2 of the fixing tape 50 while fixing the length L1 of the battery device 20.

As the oriented polystyrene tape, a tape (having a thickness of 56 μm) in which a base layer including oriented polystyrene and an adhesive layer (a rubber-based adhesive layer having a thickness of 5 μm) were stacked on each other was used. The base layer including oriented polystyrene included an oriented polystyrene layer (having a thickness of 40 μm), a rubber-based adhesive layer (having a thickness of 5 μm), and a PET layer (having a thickness of 6 μm) that were stacked on each other in this order from a side farther from the adhesive layer. In a case of attaching the fixing tape 50 (the oriented polystyrene tape) to the wound body, the base layer including oriented polystyrene was caused to face the wound body. In this case, the fixing tape 50 was adhered to the outer package film 10 via the adhesive layer.

As the hot-melt tape, a tape (having a thickness of 80 μm) in which a hot-melt adhesive layer (a styrene-isoprene-styrene blocked copolymer (SIS) layer having a thickness of 68 μm) and a base layer (a PET layer having a thickness of 12 μm) were stacked in this order was used. In a case of attaching the fixing tape 50 (the hot-melt tape) to the wound body, the hot-melt adhesive layer was caused to face the wound body. When heating and applying pressure to the fixing tape 50 (the hot-melt tape) in a later process, a portion of the hot-melt adhesive layer was pushed out around the fixing tape 50. The fixing tape 50 was adhered to, for example, the outer package film 10 via the pushed-out hot adhesive layer.

The column of "correcting tape (presence)" in Table 1 indicates whether the correcting tape 60 was attached to the wound body. Here, the correcting tape 60 was attached to the wound body and, for comparison, the correcting tape 60 was not attached to the wound body.

Thereafter, using the pouch-shaped outer package film 10 with one end (the opening) open, the wound body was placed inside the outer package film 10 through the opening, following which the electrolytic solution was injected into the outer package film 10 through the opening. As the outer package film 10, an aluminum laminated film was used in which a fusion-bonding layer (a polypropylene film having a thickness of 30 μm), a metal layer (an aluminum foil having a thickness of 40 μm), and a surface protective layer (a nylon film having a thickness of 25 μm) were stacked in this order from an inner side.

Thereafter, portions of the outer package film 10 (the fusion-bonding layer) opposed to each other at the opening were thermal-fusion-bonded to each other in such a manner that each of the positive electrode lead 31 and the negative electrode lead 32 was led out from the outer package film 10 to the outside. In this case, the sealing film 41 (a polypropylene film having a thickness of 5 μm) was interposed between the outer package film 10 and the positive electrode lead 31, and the sealing film 42 (a polypropylene film having a thickness of 5 μm) was interposed between the outer package film 10 and the negative electrode lead 32. The wound body was thereby impregnated with the electrolytic solution, and the battery device 20 as the wound electrode body was thus fabricated. The outer package film 10 was sealed, and the battery device 20 was thus sealed inside the outer package film 10.

Lastly, with use of a heat pressing machine, pressure was applied to the secondary battery under heating at the location where the fixing tape 50 was disposed. Various conditions including, for example, a temperature at a time of the heating and a pressure at a time of the pressure application were adjusted in such a manner as to be a temperature and a pressure at which the fixing tape 50 was able to exhibit adhesion. The fixing tape 50 was thus adhered to, for example, the battery device 20. In this manner, the outer package film 10 and the battery device 20 were adhered to each other via the fixing tape 50. As a result, the battery device 20 was fixed to the outer package film 10 via the fixing tape 50, and the secondary battery was thus assembled.

(Stabilization of Secondary Battery)

The secondary battery was charged and discharged for one cycle in an ambient temperature environment (at a temperature of 23° C.). Upon the charging, the secondary battery was charged with a constant current of 0.1 C until a voltage reached 4.45 V, and was thereafter charged with a constant voltage of 4.45 V until a current reached 0.05 C. Upon the discharging, the secondary battery was discharged with a constant current of 0.1 C until the voltage reached 3.0 V. Note that 0.1 C is a value of a current that causes a battery capacity (a theoretical capacity) to be completely discharged in 10 hours, and 0.05 C is a value of a current that causes the battery capacity to be completely discharged in 20 hours.

In this manner, a film was formed on a surface of, for example, the negative electrode 22, and a state of the secondary battery was thus stabilized. As a result, the secondary battery of the laminated-film type was completed.

[Fabrication of Comparative Secondary Battery]

For comparison, a series of secondary batteries described below was also fabricated. The secondary batteries were fabricated by a similar procedure except that a configuration at the time of attaching the fixing tape 50 was changed to a configuration indicated in the column of "configuration" in Table 1 (Comparative examples 1 to 4 and 6). The secondary battery was fabricated by a similar procedure except that no fixing tape 50 was attached to the wound body (Comparative example 5). The secondary batteries were fabricated by a similar procedure except that the positive electrode active material layer 21B (or the negative electrode active material layer 22B) was not formed on the surface F2 on the inner side of the winding in the positive electrode 21 (or the negative electrode 22) of the outermost wind (Comparative examples 7 and 9). The secondary battery was fabricated by a similar procedure except that the battery device 20 was fabricated in such a manner that the separator 23 was disposed in the outermost wind (Comparative example 8).

Evaluation of characteristics (a dimension characteristic, drop durability characteristic, and a temperature characteristic) of the secondary batteries revealed the results presented in Table 1.

In a case of evaluating the dimension characteristic, the secondary battery was charged in an ambient temperature environment, following which a thickness (an initial thickness (mm)) of the secondary battery was measured with a thickness gauge (constant-pressure thickness gauge PG-02J available from Teclock Corporation). Charging conditions were similar to those in the stabilization of the secondary battery described above. The initial thickness was a maximum thickness of the secondary battery in a fully charged state.

In a case of evaluating the drop durability characteristic, a work of performing 100 times a drop test using the secondary battery and thereafter checking a state of the secondary battery was repeated to examine the maximal number of drops (the number of times of endurance (times)) at which the secondary battery maintained its normal state without being damaged. The drop test was carried out in accordance with JIS 60068-2-31:2013 (Environmental testing—Electric & Electronics—Part 2-31: Drop and topple test), except that a drop height of Free fall test—Procedure 2 (repeated) was changed to 0.5 m. In a case of checking the state of the secondary battery, the secondary battery was determined to be damaged in any of the following cases: a case where charging and discharging were not possible due to the fact that the secondary battery moved violently inside the outer package film 10; a case where 1 kHz impedance of the secondary battery rose markedly; a case where the outer package film 10 was damaged; or a case where a short circuit occurred in the secondary battery.

In a case of evaluating the temperature characteristic, the secondary battery was charged and discharged in an ambient temperature environment (at a temperature of 23° C.±3° C.) and a temperature at a substantially middle part of the secondary battery (the outer package film 10) was measured during discharging, to thereby measure a maximum value of the temperature (a maximum temperature (° C.)). Charging and discharging conditions were similar to those in the case of performing the stabilization process of the secondary battery, except that a value of a current at the time of discharging was changed from 0.1 C to 2 C. Note that 2 C is a value of a current that causes the battery capacity to be completely discharged in 0.5 hours.

TABLE 1

| Experiment example | Config- uration | Fixing tape Presence | Fixing tape Provision location | Fixing tape Kind | Fixing tape Proportion (%) | Correcting tape Presence | Battery device Outermost wind | Active material layer Outer side of winding | Active material layer Inner side of winding | Initial thickness (mm) | Number of times of endurance (times) | Maximum temperature (° C.) |
|---|---|---|---|---|---|---|---|---|---|---|---|---|
| Example 1 | FIG. 5 | Yes | R1 + R2 | OPS | 90 | Yes | Positive electrode | No | Yes | 3.748 | 3100 | 38.4 |
| Example 2 | FIG. 15 | Yes | R1 + R2 | OPS | 100 | Yes | Positive electrode | No | Yes | 3.753 | 3200 | 38.6 |
| Example 3 | FIG 16 | Yes | R1 + R2 | OPS | 50 | Yes | Positive electrode | No | Yes | 3.747 | 2700 | 38.2 |
| Example 4 | FIG. 5 | Yes | R1 + R2 | HM | 90 | Yes | Positive electrode | No | Yes | 3.759 | 3000 | 38.5 |
| Example 5 | FIG. 17 | Yes | R1 + R2 | OPS | 90 | Yes | Negative electrode | No | Yes | 3.788 | 2800 | 38.3 |
| Example 6 | FIG. 19 | Yes | R1 + R2 | OPS | 90 | No | Positive electrode | No | Yes | 3.751 | 2700 | 38.2 |
| Comparative example 1 | FIG. 8 | Yes | R3 | OPS | 70 | Yes | Positive electrode | No | Yes | 3.750 | 1700 | 38.5 |
| Comparative example 2 | FIG. 9 | Yes | R1 to R3 | OPS | 45 | Yes | Positive electrode | No | Yes | 3.750 | 1600 | 38.8 |
| Comparative example 3 | FIG. 10 | Yes | (R1 to R3) × 2 | OPS | 20 | Yes | Positive electrode | No | Yes | 3.823 | 1500 | 38.3 |
| Comparative example 4 | FIG. 11 | Yes | R1 to R3 | OPS | 70 | Yes | Positive electrode | No | Yes | 3.831 | 2700 | 41.3 |
| Comparative example 5 | FIG. 12 | No | — | — | — | Yes | Positive electrode | No | Yes | 3.730 | 700 | 38.0 |
| Comparative example 6 | FIG. 13 | Yes | R1 + R2 | OPS | 30 | Yes | Positive electrode | No | Yes | 3.754 | 1500 | 38.2 |
| Comparative example 7 | FIG. 14 | Yes | R1 + R2 | OPS | 90 | Yes | Positive electrode | No | No | 3.791 | 1100 | 37.9 |
| Comparative example 8 | — | Yes | R1 + R2 | OPS | 90 | Yes | Separator | No | Yes | 3.794 | 900 | 38.1 |
| Comparative example 9 | FIG. 18 | Yes | R1 + R2 | OPS | 90 | Yes | Negative electrode | No | No | 3.832 | 1000 | 37.8 |

As described in Table 1, each of the dimension characteristic, the drop durability characteristic, and the temperature characteristic of the secondary battery greatly varied depending on the configuration of the secondary battery.

Specifically, in a case where no fixing tape 50 was disposed in any of the regions R1 to R3 (Comparative example 5), the initial thickness did not increase and the maximum temperature decreased, but the number of times of endurance greatly decreased.

Further, in a case where the fixing tape 50 was disposed only in the region R3 (Comparative example 1) and in a case where the fixing tape 50 was disposed not only in the region R3 but also in each of the regions R1 and R2 (Comparative examples 2 to 4), the initial thickness increased, the number of times of endurance decreased, or the maximum temperature increased. In particular, in a case where an area of the fixing tape 50 was large (Comparative example 4), the number of times of endurance increased, but the initial thickness increased and the maximum temperature increased.

Further, in a case where the proportion was less than 50% (Comparative example 6), the initial thickness did not increase and the maximum temperature decreased, but the number of times of endurance greatly decreased.

Further, in a case where no positive electrode active material layer 21B was provided on the surface F2 on the inner side of the winding in the positive electrode 21 of the outermost wind (Comparative example 7), the initial thickness did not increase and the maximum temperature decreased, but the number of times of endurance greatly decreased. Moreover, in a case where no negative electrode active material layer 22B was provided on the surface F2 on the inner side of the winding in the negative electrode 22 of the outermost wind (Comparative example 9), the maximum temperature decreased, but the initial thickness increased and the number of times of endurance decreased.

In addition, in a case where the separator 23 was disposed in the outermost wind of the battery device 20 (Comparative example 8), the initial thickness did not increase and the maximum temperature decreased, but the number of times of endurance greatly decreased.

In contrast, in a case where the fixing tape 50 was not disposed in the region R3 and was disposed in each of the regions R1 and R2, where the proportion was within the range from 50% to 100% both inclusive, and where the positive electrode active material layer 21B (or the negative electrode active material layer 22B) was provided on the surface F2 on the inner side of the winding in the positive electrode 21 (or the negative electrode 22) in the outermost wind (Examples 1 to 6), the initial thickness did not increase, the number of times of endurance increased, and the maximum temperature decreased.

In this case, the following tendencies were obtained, in particular. Satisfactory results were obtained regardless of the kind of the fixing tape 50 (the oriented polystyrene tape or the hot-melt tape). In addition, in a case where the correcting tape 60 was used, the number of times of endurance further increased as compared with a case where the correcting tape 60 was not used.

Based upon the results presented in Table 1, the initial thickness did not increase, the number of times of endurance increased, and the maximum temperature decreased in a case where: the battery device 20 having an elongated shape was contained inside the outer package film 10 having flexibility; the fixing tape 50 which was not disposed in the region R3 and was disposed in each of the regions R1 and R2 was adhered to each of the outer package film 10 and the battery device 20; the proportion of the length L2 of the fixing tape 50 to the length L1 of the battery device 20 was within the range from 50% to 100% both inclusive; and the positive electrode active material layer 21B (or the negative electrode active material layer 22B) was not provided on the surface F1 on the outer side of the winding in the positive electrode 21 (or the negative electrode 22) of the outermost wind and the positive electrode active material layer 21B (or the negative electrode active material layer 22B) was provided on the surface F2 on the inner side of the winding in the positive electrode 21 (or the negative electrode 22) of the outermost wind. Accordingly, the secondary battery achieved superior physical durability and superior safety while securing energy density per unit volume.

Although the present technology has been described herein with reference to one or more embodiments including Examples, the configuration of the present technology is not limited to such description, and is therefore modifiable in a variety of suitable ways.

For example, although the description has been given of the case where the electrode reactant is lithium, the electrode reactant is not particularly limited. Thus, the electrode reactant may be another alkali metal such as sodium or potassium, or may be an alkaline earth metal such as beryllium, magnesium, or calcium, as described above. In addition, the electrode reactant may be another light metal such as aluminum.

The effects described herein are mere examples, and effects of the present technology are therefore not limited to those described herein. Accordingly, the present technology may achieve any other suitable effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
   an outer package member having flexibility;
   a battery device having an elongated shape and contained inside the outer package member, the battery device including a positive electrode and a negative electrode;
   a positive electrode terminal coupled to the positive electrode, the positive electrode terminal being led out to an outside of the outer package member;
   a negative electrode terminal coupled to the negative electrode, the negative electrode terminal being led out to the outside of the outer package member; and
   a fixing member disposed between the outer package member and the battery device, the fixing member being adhered to each of the outer package member and the battery device, wherein
   the positive electrode and the negative electrode are opposed to each other and are wound in a first direction,
   the positive electrode terminal and the negative electrode terminal are separated from each other and each extend in a second direction intersecting the first direction,
   where the battery device is divided into a first region on an outer side relative to the positive electrode terminal, a second region on an outer side relative to the negative electrode terminal, and a third region between the positive electrode terminal and the negative electrode terminal, no fixing member is disposed in the third region, and the fixing member is disposed in each of the first region and the second region, and
   a proportion of a dimension of the fixing member in the second direction to a dimension of the battery device in the second direction is greater than or equal to 50 percent and less than or equal to 100 percent,
   and wherein one or both of the positive electrode and the negative electrode includes as follows:
   the positive electrode includes
      a positive electrode current collector having a surface on an outer side of winding and a surface on an inner side of the winding, and
      a positive electrode active material layer provided on each of the surface on the outer side of the winding and the surface on the inner side of the winding,
   the positive electrode and the negative electrode are wound in such a manner that the positive electrode is disposed in an outermost wind, and
   in the positive electrode of the outermost wind, the positive electrode active material layer is not provided on the surface on the outer side of the winding, and the surface on the outer side of the winding is exposed, whereas the positive electrode active material layer is provided on the surface on the inner side of the winding, and the negative electrode includes
- a negative electrode current collector having a surface on the outer side of the winding and a surface on the inner side of the winding, and
- a negative electrode active material layer provided on each of the surface on the outer side of the winding and the surface on the inner side of the winding, the positive electrode and the negative electrode are wound in such a manner that the negative electrode is disposed in the outermost wind, and in the negative electrode of the outermost wind, the negative electrode active material layer is not provided on the surface on the outer side of the winding, and the surface on the outer side of the winding is exposed, whereas the negative electrode active material layer is provided on the surface on the inner side of the winding.

2. The secondary battery according to claim 1, wherein the fixing member includes a heat adhesive member that exhibits adhesion as a result of application of heat and pressure.

3. The secondary battery according to claim 2, wherein the heat adhesive member includes an oriented polystyrene tape, a hot-melt tape, or both.

4. The secondary battery according to claim 1, wherein the fixing member extends in the second direction.

5. The secondary battery according to claim 1, wherein
the positive electrode and the negative electrode are wound about a winding axis,
a section of the battery device intersecting the winding axis has an elongated shape defined by a major axis and a minor axis, and
the secondary battery further comprises a correcting member that extends from a first end part to a second end part in a direction along the minor axis, the correcting member being attached to the battery device at each of the first end part and the second end part.

6. The secondary battery according to claim 5, wherein the correcting member is attached to the battery device at a location other than respective locations where the positive electrode terminal and the negative electrode terminal are coupled to the battery device.

7. The secondary battery according to claim 5, wherein the correcting member is attached to the battery device in such a manner that the correcting member does not overlap with the fixing tape.

8. The secondary battery according to claim 1, wherein the secondary battery comprises a lithium-ion secondary battery.

* * * * *